(12) United States Patent
Fukushima et al.

(10) Patent No.: US 7,240,061 B2
(45) Date of Patent: Jul. 3, 2007

(54) PLACE NAME INFORMATION EXTRACTION APPARATUS AND EXTRACTION METHOD THEREOF AND STORING MEDIUM STORED EXTRACTION PROGRAMS THEREOF AND MAP INFORMATION RETRIEVAL APPARATUS

(75) Inventors: Toshikazu Fukushima, Tokyo (JP); Koji Kida, Tokyo (JP); Yoshihide Ishiguro, Tokyo (JP)

(73) Assignee: NEC Corporation, Tokyo (JP)

( * ) Notice: Subject to any disclaimer, the term of this patent is extended or adjusted under 35 U.S.C. 154(b) by 474 days.

(21) Appl. No.: 09/983,239

(22) Filed: Oct. 23, 2001

(65) Prior Publication Data

US 2002/0059285 A1    May 16, 2002

(30) Foreign Application Priority Data

Oct. 24, 2000   (JP) .............................. 2000-329805

(51) Int. Cl.
*G06F 7/00* (2006.01)
*G06F 17/30* (2006.01)
*G06F 17/00* (2006.01)

(52) U.S. Cl. .............................. 707/100; 707/3; 707/4
(58) Field of Classification Search ................ 707/102, 707/100, 3, 4, 104.1
See application file for complete search history.

(56) References Cited

U.S. PATENT DOCUMENTS

| | | | |
|---|---|---|---|
| 5,734,749 A * | 3/1998 | Yamada et al. ............. | 382/187 |
| 5,819,261 A * | 10/1998 | Takahashi et al. ............. | 707/3 |
| 5,857,187 A * | 1/1999 | Uenoyama et al. ............. | 707/6 |
| 5,907,841 A * | 5/1999 | Sumita et al. ................. | 707/6 |
| 6,076,088 A * | 6/2000 | Paik et al. ..................... | 707/5 |
| 6,263,343 B1 * | 7/2001 | Hirono ..................... | 707/104.1 |
| 6,272,490 B1 * | 8/2001 | Yamakita ...................... | 707/4 |
| 6,286,014 B1 * | 9/2001 | Fukushima et al. ......... | 707/200 |
| 6,324,467 B1 * | 11/2001 | Machii et al. ............... | 701/200 |

(Continued)

FOREIGN PATENT DOCUMENTS

JP    5-181900    7/1993

(Continued)

OTHER PUBLICATIONS

IREX-NE, "Development Of Proper Expression Extraction System and Evaluation", 1999, pp. 171-178.

*Primary Examiner*—Apu M Mofiz
*Assistant Examiner*—Cindy Nguyen
(74) *Attorney, Agent, or Firm*—Foley & Lardner LLP

(57) ABSTRACT

A place name information extraction apparatus in which not only a place name expression appeared in a text is extracted but also the type of the extracted place name expression can be judged, and a place name information extraction method of the apparatus, and a storing medium stored place name information extraction programs of the method, and a map information retrieval apparatus used the place name information extraction apparatus are provided. The place name information extraction apparatus provides a place name expression detecting means that detects a place name expression appeared in a text and its position appeared the place name expression in the text, and a place name type judging means that judges a place name type, which signifies a meaning role of the place name expression appeared in the text, by analyzing before and after the position appeared the place name expression in the text.

24 Claims, 33 Drawing Sheets

U.S. PATENT DOCUMENTS

| | | | |
|---|---|---|---|
| 6,381,637 B1 * | 4/2002 | Kamada | 709/218 |
| 6,466,940 B1 * | 10/2002 | Mills | 707/102 |
| 6,578,078 B1 * | 6/2003 | Smith et al. | 709/224 |
| 6,983,482 B2 * | 1/2006 | Morita et al. | 725/32 |
| 2002/0073124 A1 * | 6/2002 | Masuda et al. | 707/526 |

FOREIGN PATENT DOCUMENTS

| | | |
|---|---|---|
| JP | 6-52221 | 2/1994 |
| JP | 2000-29902 | 1/2000 |

* cited by examiner

FIG. 1 PRIOR ART

| WORD EXPRESSION (PLACE NAME EXPRESSION) 25 | WORD EXPRESSION CLASSIFICATION 26 | CO-OCCURENCE WORD LIST 27 |
|---|---|---|
| YOKOHAMA CITY | PLACE NAME | |
| YOKOHAMA | PLACE NAME | KANAGAWA, KANTO, CITY, ---- |
| | ORGANIZATION NAME | BAYSTARS, PROFESSIONAL BASEBALL, TEAM, ---- |
| CHIBA PREFECTURE | PLACE NAME | |
| CHIBA CITY | PLACE NAME | |
| CHIBA | PLACE NAME | PREFECTURE, CITY, ---- |
| | PERSON'S NAME | PLAYER, Mr.Ms. ---- |
| SYDNEY | PLACE NAME | |

FIG. 4

| PLACE NAME TYPE (20) | CLUE EXPRESSION (21) |
| --- | --- |
| LOCATION | LOCATION, HEADQUARTERS, BRANCH OFFICE, HOME, ---- |
| EVENT SITE | EVENT SITE, EVENT PLACE, BE HEND, EVENT, SCENE,---- |
| PASSING POINT | STARTING POINT, DEPARTING POINT, TERMINAL, VIA, ---- |
| TOPIC SPOT | GUIDE, IMPRESSION, RECOMMEDATION, MEMORY, ---- |

FIG. 7

| PLACE NAME EXPRESSION | APPEARED POSITION | PLACE NAME TYPE |
|---|---|---|
| | 22 | 23 | 24 |
| SYDNEY | 48th LETTER TO 53rd LETTER | |
| | | |

FIG. 8

THE LAST OLYMPIC GAMES IN THE 20th CENTURY WILL BE HELD AT SYDNEY FOR 17 DAYS FROM SEPTEMBER 15, 2000 THROUGH NOVEMBER 1, 2000.

| PLACE NAME EXPRESSION | APPEARED POSITION | PLACE NAME TYPE |
|---|---|---|
| SYDNEY | 48th LETTER TO 53rd LETTER | EVENT SITE |
| | | |

FIG. 11

Company.html

INTRODUCTION OF
N CORPORATION
--------
--------
ORGANIZER: N CORPORATION
○ <u>EVENT IN SEPTEMBER</u>
○ EVENT IN OCTOBER
○ EVENT IN NOVEMBER

Event09.html

IT TECHNOLOGY EXHIBITION

DATE: SEPTEMBER 1, 2000
PLACE: N CORPORATION BUILDING
MINATO WARD, TOKYO

FIG. 12

Company.html

```
<HTML>
<HEAD>
<TITLE> N Company's Home Page </TITLE>
</HEAD>
<BODY>
<H1> Introduction of N Corporation </H1>
--------------------------------
Organizer : N Corporation
o <A HREF="Event09.html"> EVENT in September </A>
o <A HREF="Event10.html"> EVENT in October </A>
o <A HREF="Event11.html"> EVENT in November </A>
</BODY>
</HTML>
```

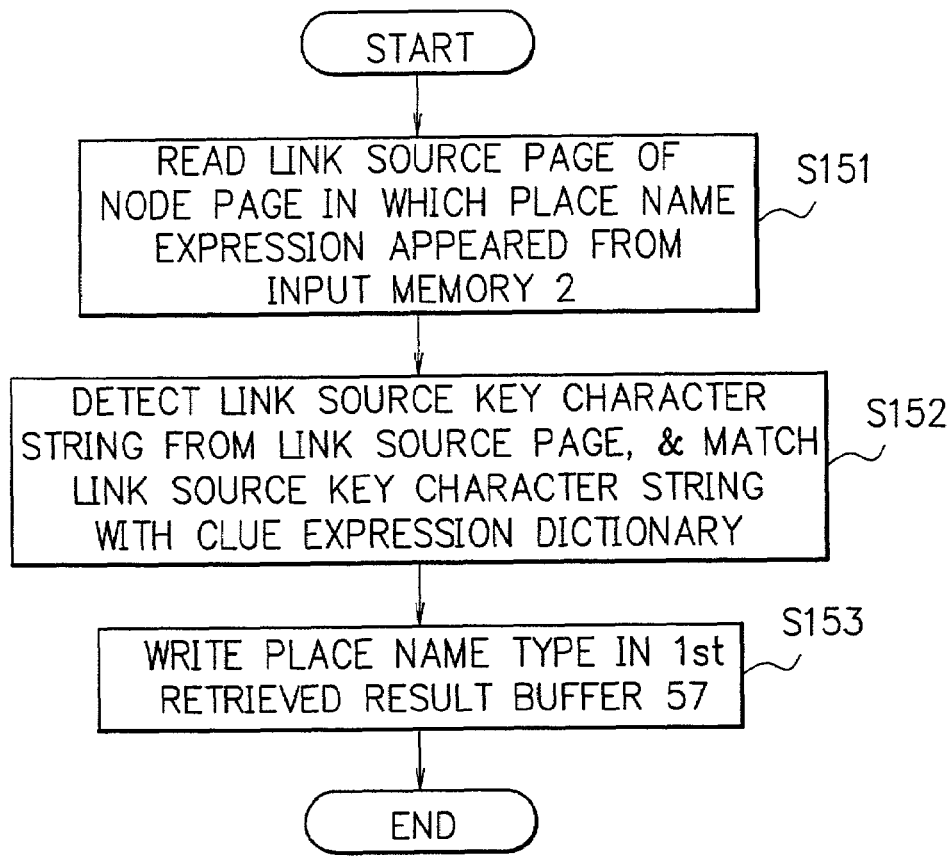

FIG. 19

| PLACE NAME EXPRESSION 22 | APPEARED POSITION 23 | PLACE NAME TYPE 24 |
|---|---|---|
| N CORPORATION BUILDING, MINATO WARD, TOKYO | NODE PAGE 31, 49th LETTER TO 85th LETTER | EVENT SITE |
|  |  |  |

FIG. 24

| RULE No. | MATCHING RULE | PLACE NAME TYPE DECIDING RULE |
|---|---|---|
| 1 | • LINK EXISTS FROM NODE PAGE X TO NODE PAGEY, FURTHER LINK EXISTS FROM NODE PAGE Y TO NODE PAGE Z<br>• PLACE NAME EXPRESSION A IS INCLUDED IN LINK SOURCE KEY CHARACTER STRING OF NODE PAGE Y<br>• PLURAL PLACE NAME EXPRESSIONS Bi ARE INCLUDED IN NODE PAGE Z<br>• PLURAL PLACE NAME EXPRESSIONS Bi POSITION BELOW PLACE NAME EXPRESSION A AT PLACE NAME CLASS RELATION | • PLACE NAME TYPE IS DECIDED BASED ON CLUE EXPRESSION, WHICH IS INCLUDED IN LINK SOURCE KEY CHARACTER STRING IN NODE PAGE X OR IN CHARACTER STRINGS BEFORE AND AFTER PLACE NAME EXPRESSION A IN NODE PAGE Y |
| 2 | • LINK EXISTS FROM NODE PAGE X TO NODE PAGE Y<br>• PLURAL LINK SOURCE KEY CHARACTER STRINGS INCLUDING PLACE NAME EXPRESSION Bi EXIST IN NODE PAGE Y<br>• PLACE NAME EXPRESSION Bi IS IN BROTHER/SISTER RELATION AT PLACE NAME CLASS RELATION | • PLACE NAME TYPE IS DECIDED BASED ON CLUE EXPRESSION INCLUDING IN LINK SOURCE KEY CHARACTER STRING OF NODE PAGE X<br>• WHEN CLUE EXPRESSION WAS NOT OBTAINED FROM NODE PAGE X, PLACE NAME TYPE IS DECIED BY SEARCHING CLUE EXPRESSION, WHICH IS INCLUDED IN LINK SOURCE KEY CHARACTER STRING OF NODE PAGE X |
| 3 | • LINK SERIES EXISTS FROM NODE PAGE X TO NODE PAGE Z<br>• PLACE NAME EXPRESSION A IS INCLUDED IN NODE PAGE Z | • PLACE NAME TYPE OF PLACE NAME EXPRESSION A IS DECIDED BASED ON CLUE EXPRESSION INCLUDING IN GROUP OF LINK SOURCE KEY CHARACTER STRING SERIES APPEARED IN EACH PAGE OF NODE PAGES X TO Z |

FIG. 26
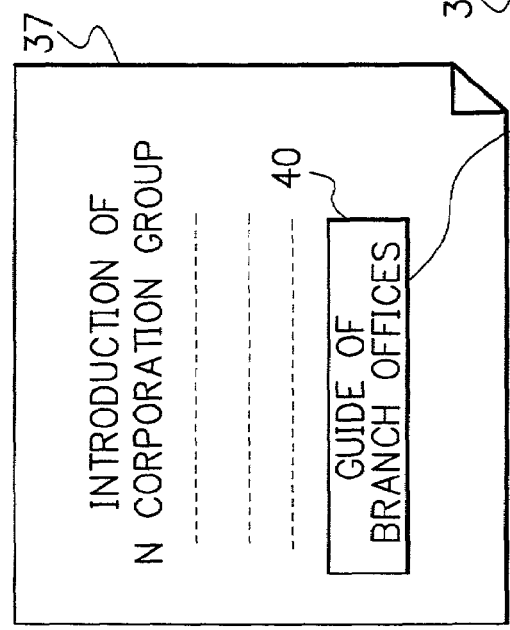
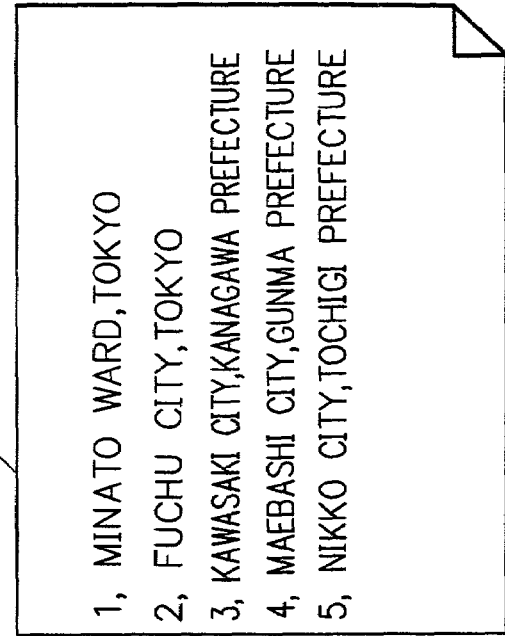

F I G. 29
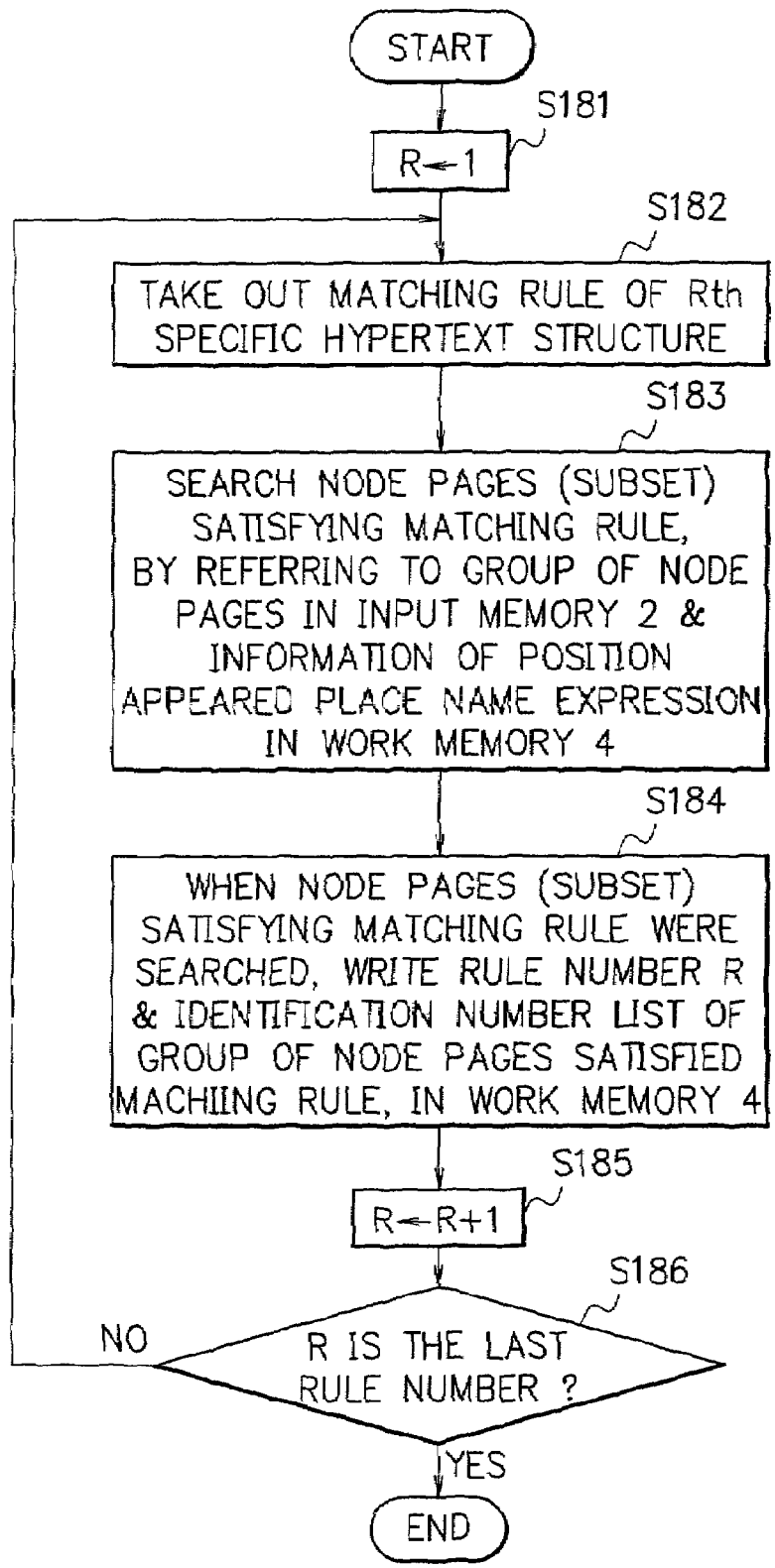

F I G. 32

| PLACE NAME EXPRESSION | PLACE NAME TYPE | NODE PAGE No. |
|---|---|---|
| MINATO WARD, TOKYO | EVENT SITE | 31 |
| MINATO WARD, TOKYO | LOCATION | 39 |
| FUCHU CITY, TOKYO | LOCATION | 39 |
| KAWASAKI CITY, KANAGAWA PREFECTURE | LOCATION | 39 |
| MAEBASHI CITY, GUNMA PREFECTURE | LOCATION | 39 |
| NIKKO CITY, TOCHIGI PREFECTURE | LOCATION | 39 |
| | | |

181  182  183

F I G. 35
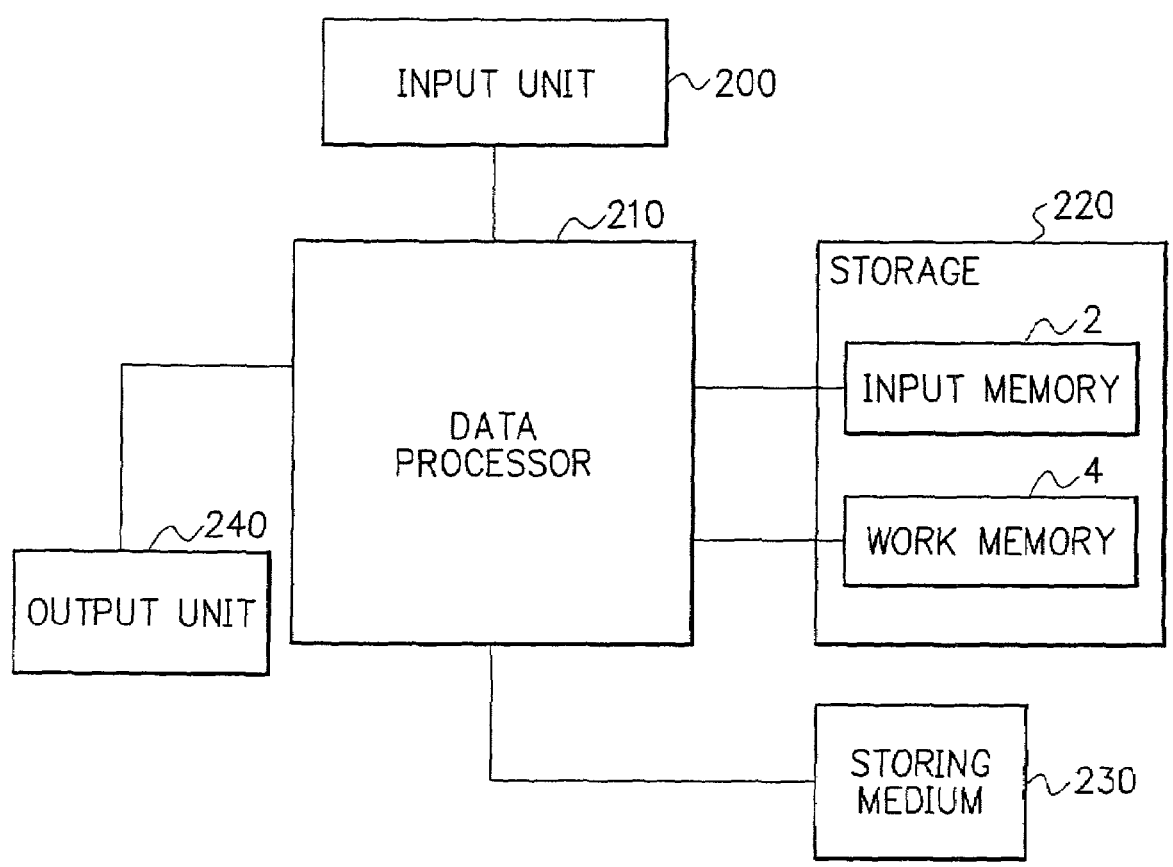

PLACE NAME INFORMATION EXTRACTION APPARATUS AND EXTRACTION METHOD THEREOF AND STORING MEDIUM STORED EXTRACTION PROGRAMS THEREOF AND MAP INFORMATION RETRIEVAL APPARATUS

BACKGROUND OF THE INVENTION

The present invention relates to a place name information extraction apparatus in which place name information appeared in a text is extracted and a place name information extraction method of the apparatus and a storing medium stored place name information extraction programs of the method, and a map information retrieval apparatus used the place name information extraction apparatus.

DESCRIPTION OF THE RELATED ART

At a conventional place name information extraction system, its object is to extract a place name expression appeared in a text. In order to achieve this, at a most basic system, a dictionary, in which place name expressions are stored, is provided, and a place name expression appeared in a text is extracted by matching the text with the dictionary. For example, first, place name expressions such as "Yokohama City" and "Chiba Prefecture" are registered in the dictionary, and when "Yokohama City" and "Chiba Prefecture" appeared in the text, these are extracted as place names.

However, in a case, a name expression can not be judged to be a place name expression by only matching the name expression with a dictionary. For example, when a name expression "Yokohama" appeared in a text, this name expression may be a place name expression or an organization name expression (professional baseball team called "Yokohama Bay Stars". And also, when a name expression "Chiba" appeared in a text, as the same as above, this name expression may be a place name expression or a person's name expression.

In order to remove this kind of vagueness at the place name information extraction, there are following two conventional methods.

At a first conventional method, the vagueness is removed by referring to co-occurrence words, which appeared before and after an expression having possibility of a place name expression, or referring to co-occurrence words appeared in the same text. For example, when a co-occurrence word "player" appeared soon after "Chiba" being a place name candidate expression, this "Chiba" is judged to be a person's name expression, not a place name expression. On the contrary, when a co-occurrence word "Prefecture" appeared soon after the expression "Chiba", this "Chiba" is judged to be a place name expression. In this case, it is enough that the information of the co-occurrence words are described in a place name expression dictionary. FIG. 1 is a diagram showing an example of a place name expression dictionary having co-occurrence word expressions. As shown in FIG. 1, the place name expression dictionary consists of a word expression (place name expression) column 25, a word expression classification column 26, and a co-occurrence word list column 27. And co-occurrence words are stored in the co-occurrence word list column 27 when expressions in the word expression classification column 26 have plural classifications.

At a second conventional method, it is investigated whether an expression, which includes a place name candidate expression, appeared or not at other position in the same text, and the vagueness is removed. For example, an expression "Yokohama" has vagueness being a place name or an organization name. However, when an expression "Yokohama Bay Stars" appeared in the same text, the expression "Yokohama" can be judged as a short form of the expression "Yokohama Bay Stars", that is, the expression can be judged as the organization name with high possibility.

These methods are described in a technical report, written by Y. Takemoto, T. Fukushima, H. Yamada, A. Okumura, and T. Ikeda "Development of Proper Expression Extraction System and Evaluation by IREX-NE", for IREX workshop, 1999. In this, the IREX-NE signifies that information retrieval and extraction exercise-named entity. And also these methods are described in Japanese Patent Application Laid-Open No. HEI 6-52221 "Automatic Extraction System of Proper Nouns" and Japanese Patent Application Laid-Open No. HEI 5-181900 "Proper Noun Processing Apparatus".

As mentioned above, at the conventional place name information extraction systems, their object is to extract a place name expression appeared in a text with high accuracy. However, in order to utilize the extracted place name information more effectively, it is desirable that the place name type of the place name expression can be judged, not only extracting the place name expression. In this, the place name type signifies a meaning role of a place name expression in a text. As the place name types, for example, locations (locations of a company, a private house, and so on), event sites (a site of event, an incident, and so on), passing points (starting point, terminal point, and passing through point at moving), and topic spots (spots being objects in guide books, in a news commentary, in an impression, and so on) are supposed. If it is necessary, the locations can be divided into smaller parts such as a company location, a school location, and so on.

And at the world wide web (WWW) on the Internet, a huge amount of information is transmitted. Therefore, when information concerning a place name expression and its place name type can be extracted with high accuracy from a hypertext database using in such as the WWW, the Internet can be utilized as an effective information source for the place name information.

SUMMARY OF THE INVENTION

It is therefore an object of the present invention to provide a place name information extraction apparatus in which not only a place name expression appeared in a text is extracted but also the type of the extracted place name expression can be judged and a place name information extraction method of the apparatus and a storing medium stored place name information extraction programs of the method, and a map information retrieval apparatus used the place name information extraction apparatus. Furthermore, the present invention provides a place name information extraction apparatus in which a place name expression and the type of the place name expression can be extracted from a hypertext database using at the WWW with high accuracy and a place name information extraction method of the apparatus and a storing medium stored place name information extraction programs of the method, and a map information retrieval apparatus used the place name information extraction apparatus.

According to a first aspect of the present invention for achieving the object mentioned above, there is provided a place name information extraction apparatus. The place name information extraction apparatus provides a place name type judging means that judges a place name type, which signifies a meaning role of a place name expression appeared in a text, by referring to the text.

According to a second aspect of the present invention, there is provided a place name information extraction apparatus. The place name information extraction apparatus provides a place name expression detecting means that detects a place name expression appeared in a text and a position appeared the place name expression in the text, and a place name type judging means that judges a place name type, which signifies a meaning role of the place name expression appeared in the text, by analyzing before and after the position appeared the place name expression in the text.

According to a third aspect of the present invention, there is provided a place name information extraction apparatus. The place name information extraction apparatus provides a place name type judging means that judges a place name type, which signifies a meaning role of a place name expression appeared in a text, by detecting a clue expression which is possible to judge the place name type of the place name expression appeared in the text, and a place name detecting means that detects the place name expression in the text by analyzing the text before and after position appeared the clue expression.

According to a fourth aspect of the present invention, there is provided a place name information extraction apparatus. The place name information extraction apparatus provides a place name type judging means that judges a place name type, which signifies a meaning role of a place name expression appeared in one of node pages of which a hypertext is composed, by detecting a clue expression which is possible to judge the place name type from either a link source page or a link destination page of the one of node pages or from both of the link source page and the link destination page.

According to a fifth aspect of the present invention, there is provided a place name information extraction apparatus. The place name information extraction apparatus provides a place name type judging means that judges a place name type, which signifies a meaning role of a place name expression appeared in one of node pages of which a hypertext is composed, based on a text type of a text of the one of node pages.

According to a sixth aspect of the present invention, there is provided a place name information extraction apparatus. The place name information extraction apparatus provides a first place name type judging means that judges a place name type, which signifies a meaning role of a place name expression appeared in one of node pages of which a hypertext is composed, by detecting a clue expression which is possible to judge the place name type from either a link source page or a link destination page of the one of node pages or from both of the link source page and the link destination page, a second place name type judging means that judges the place name type of the place name expression appeared in the one of node pages based on a text type of a text of the one of node pages, and a final place name type judging means that judges a final place name type based on judged results from the first and second place name type judging means.

According to a seventh aspect of the present invention, there is provided a place name information extraction apparatus. The place name information extraction apparatus provides a place name expression detecting means that detects a place name expression appeared in one of node pages of which a hypertext is composed and a position appeared the place name expression in the one of node pages, and a place name type judging means that judges a place name type, which signifies a meaning role of the place name expression appeared in the one of node pages, by detecting a clue expression which is possible to judge the place name type by referring to either a link source page or a link destination page of the one of node pages or both of the link source page and the link destination page.

According to an eighth aspect of the present invention, there is provided a place name information extraction apparatus. The place name information extraction apparatus provides a place name expression detecting means that detects a place name expression appeared in one of node pages of which a hypertext is composed and a position appeared the place name expression in the one of node pages, and a place name type judging means that judges a place name type, which signifies a meaning role of the place name expression appeared in the one of node pages, by judging a text type of a text of the one of node pages in which the place name expression appeared.

According to an ninth aspect of the present invention, there is provided a place name information extraction apparatus. The place name information extraction apparatus provides a place name expression detecting means that detects a place name expression appeared in one of node pages of which a hypertext is composed and a position appeared the place name expression in the one of node pages, a first place name type judging means that judges a place name type, which signifies a meaning role of the place name expression appeared in the one of node pages of which a hypertext is composed, by detecting a clue expression which is possible to judge the place name type from either a link source page or a link destination page of the one of node pages or from both of the link source page and the link destination page, a second place name type judging means that judges the place name type of the place name expression appeared in the one of node pages based on a text type of a text of the one of node pages, and a final place name type judging means that judges a final place name type based on judged results from the first and second place name type judging means.

According to a tenth aspect of the present invention, there is provided a place name information extraction apparatus. The place name information extraction apparatus provides a place name type judging means that judges a place name type, which signifies a meaning role of a place name expression appeared in one of node pages of which a hypertext is composed, by detecting a clue expression which is possible to judge the place name type in the one of node pages, and a place name expression detecting means that detects the place name expression in the one of node pages from a link source page or a link destination page of the one of node pages in which the clue expression appeared.

According to an eleventh aspect of the present invention, there is provided a place name information extraction apparatus. The place name information extraction apparatus provides a place name type judging means that judges a place name type, which signifies a meaning role of a place name expression appeared in one of node pages of which a hypertext is composed, by judging a text type of a text of the one of node pages, and a place name expression detecting means that detects the place name expression from the one of node pages.

According to a twelfth aspect of the present invention, there is provided a place name information extraction apparatus. The place name information extraction apparatus provides a place name expression detecting means that detects a place name expression from a text of node pages of which a hypertext is composed, a site structure analyzing means that investigates whether a group of node pages neighboring and including a node page in which the place name expression was detected satisfies a specific hypertext structure or not, and a place name type judging means that decides a place name type, which signifies a meaning role of the place name expression appeared in the node page, of the place name expression included in the group of node pages that satisfied the specific hypertext structure.

According to a thirteenth aspect of the present invention, there is provided a place name information extraction method. The place name information extraction method provides the step of, judging a place name type, which signifies a meaning role of a place name expression appeared in a text, by referring to the text.

According to a fourteenth aspect of the present invention, there is provided a place name information extraction method. The place name information extraction method provides the steps of, detecting a place name expression appeared in a text and a position appeared the place name expression in the text, and judging a place name type, which signifies a meaning role of the place name expression appeared in the text, by analyzing before and after the position appeared the place name expression in the text.

According to a fifteenth aspect of the present invention, there is provided a place name information extraction method. The place name information extraction method provides the steps of, judging a place name type, which signifies a meaning role of a place name expression appeared in a text, by detecting a clue expression which is possible to judge the place name type of the place name expression appeared in the text, and detecting the place name expression in the text by analyzing the text before and after position appeared the clue expression.

According to a sixteenth aspect of the present invention, there is provided a place name information extraction method. The place name information extraction method provides the step of, judging a place name type, which signifies a meaning role of a place name expression appeared in one of node pages of which a hypertext is composed, by detecting a clue expression which is possible to judge the place name type from either a link source page or a link destination page of the one of node pages or from both of the link source page and the link destination page.

According to a seventeenth aspect of the present invention, there is provided a place name information extraction method. The place name information extraction method provides the step of; judging a place name type, which signifies a meaning role of a place name expression appeared in one of node pages of which a hypertext is composed, based on a text type of a text of the one of node pages.

According to an eighteenth aspect of the present invention, there is provided a place name information extraction method. The place name information extraction method provides the steps of, judging a place name type, which signifies a meaning role of a place name expression appeared in one of node pages of which a hypertext is composed, by detecting a clue expression which is possible to judge the place name type from either a link source page or a link destination page of the one of node pages or from both of the link source page and the link destination page, judging the place name type of the place name expression appeared in the one of node pages based on a text type of a text of the one of node pages, and judging a final place name type based on judged results based on the detecting the clue expression and the text type.

According to a nineteenth aspect of the present invention, there is provided a place name information extraction method. The place name information extraction method provides the steps of; detecting a place name expression appeared in one of node pages of which a hypertext is composed and a position appeared the place name expression in the one of node pages, and judging a place name type, which signifies a meaning role of the place name expression appeared in the one of node pages, by detecting a clue expression which is possible to judge the place name type by referring to either a link source page or a link destination page of the one of node pages or both of the link source page and the link destination page.

According to a twentieth aspect of the present invention, there is provided a place name information extraction method. The place name information extraction method provides the steps of, detecting a place name expression appeared in one of node pages of which a hypertext is composed and a position appeared the place name expression in the one of node pages, and judging a place name type, which signifies a meaning role of the place name expression appeared in the one of node pages, by judging a text type of a text of the one of node pages in which the place name expression appeared.

According to a twenty-first aspect of the present invention, there is provided a place name information extraction method. The place name information extraction method provides the steps of; detecting a place name expression appeared in one of node pages of which a hypertext is composed and a position appeared the place name expression in the one of node pages, judging a place name type, which signifies a meaning role of the place name expression appeared in the one of node pages of which a hypertext is composed, by detecting a clue expression which is possible to judge the place name type from either a link source page or a link destination page of the one of node pages or from both of the link source page and the link destination page, judging the place name type of the place name expression appeared in the one of node pages based on a text type of a text of the one of node pages, and judging a final place name type based on judged results based on the detecting the clue expression and the text type.

According to a twenty-second aspect of the present invention, there is provided a place name information extraction method. The place name information extraction method provides the steps of judging a place name type, which signifies a meaning role of a place name expression appeared in one of node pages of which a hypertext is composed, by detecting a clue expression which is possible to judge the place name type in the one of node pages, and detecting the place name expression in the one of node pages from a link source page or a link destination page of the one of node pages in which the clue expression appeared.

According to a twenty-third aspect of the present invention, there is provided a place name information extraction method. The place name information extraction method provides the steps of, judging a place name type, which signifies a meaning role of a place name expression appeared in one of node pages of which a hypertext is composed, by judging a text type of a text of the one of node pages, and detecting the place name expression from the one of node pages.

According to a twenty-fourth aspect of the present invention, there is provided a place name information extraction method. The place name information extraction method provides the steps of; detecting a place name expression from a text of node pages of which a hypertext is composed, investigating whether a group of node pages neighboring and including a node page in which the place name expression was detected satisfies a specific hypertext structure or not, and deciding a place name type, which signifies a meaning role of the place name expression appeared in the node page, of the place name expression included in the group of node pages that satisfied the specific hypertext structure.

According to a twenty-fifth aspect of the present invention, there is provided a storing medium stored extraction programs for a place name information extraction method. The storing medium stored extraction programs provides the step of, judging a place name type, which signifies a meaning role of a place name expression appeared in a text, by referring to the text.

According to a twenty-sixth aspect of the present invention, there is provided a storing medium stored extraction programs for a place name information extraction method. The storing medium stored extraction programs provides the steps of, detecting a place name expression appeared in a text and a position appeared the place name expression in the text, and judging a place name type, which signifies a meaning role of the place name expression appeared in the text, by analyzing before and after the position appeared the place name expression in the text.

According to a twenty-seventh aspect of the present invention, there is provided a storing medium stored extraction programs for a place name information extraction method. The storing medium stored extraction programs provides the steps of; judging a place name type, which signifies a meaning role of a place name expression appeared in a text, by detecting a clue expression which is possible to judge the place name type of the place name expression appeared in the text, and detecting the place name expression in the text by analyzing the text before and after position appeared the clue expression.

According to a twenty-eighth aspect of the present invention, there is provided a storing medium stored extraction programs for a place name information extraction method. The storing medium stored extraction programs provides the step of, judging a place name type, which signifies a meaning role of a place name expression appeared in one of node pages of which a hypertext is composed, by detecting a clue expression which is possible to judge the place name type from either a link source page or a link destination page of the one of node pages or from both of the link source page and the link destination page.

According to a twenty-ninth aspect of the present invention, there is provided a storing medium stored extraction programs for a place name information extraction method. The storing medium stored extraction programs provides the step of, judging a place name type, which signifies a meaning role of a place name expression appeared in one of node pages of which a hypertext is composed, based on a text type of a text of the one of node pages.

According to a thirtieth aspect of the present invention, there is provided a storing medium stored extraction programs for a place name information extraction method. The storing medium stored extraction programs provides the steps of, judging a place name type, which signifies a meaning role of a place name expression appeared in one of node pages of which a hypertext is composed, by detecting a clue expression which is possible to judge the place name type from either a link source page or a link destination page of the one of node pages or from both of the link source page and the link destination page, judging the place name type of the place name expression appeared in the one of node pages based on a text type of a text of the one of node pages, and judging a final place name type based on judged results based on the detecting the clue expression and the text type.

According to a thirty-first aspect of the present invention, there is provided a storing medium stored extraction programs for a place name information extraction method. The storing medium stored extraction programs provides the steps of; detecting a place name expression appeared in one of node pages of which a hypertext is composed and a position appeared the place name expression in the one of node pages, and judging a place name type, which signifies a meaning role of the place name expression appeared in the one of node pages, by detecting a clue expression which is possible to judge the place name type by referring to either a link source page or a link destination page of the one of node pages or both of the link source page and the link destination page.

According to a thirty-second aspect of the present invention, there is provided a storing medium stored extraction programs for a place name information extraction method. The storing medium stored extraction programs provides the steps of; detecting a place name expression appeared in one of node pages of which a hypertext is composed and a position appeared the place name expression in the one of node pages, and judging a place name type, which signifies a meaning role of the place name expression appeared in the one of node pages, by judging a text type of a text of the one of node pages in which the place name expression appeared.

According to a thirty-third aspect of the present invention, there is provided a storing medium stored extraction programs for a place name information extraction method. The storing medium stored extraction programs provides the steps of; detecting a place name expression appeared in one of node pages of which a hypertext is composed and a position appeared the place name expression in the one of node pages, judging a place name type, which signifies a meaning role of the place name expression appeared in the one of node pages of which a hypertext is composed, by detecting a clue expression which is possible to judge the place name type from either a link source page or a link destination page of the one of node pages or from both of the link source page and the link destination page, judging the place name type of the place name expression appeared in the one of node pages based on a text type of a text of the one of node pages, and judging a final place name type based on judged results based on the detecting the clue expression and the text type.

According to a thirty-fourth aspect of the present invention, there is provided a storing medium stored extraction programs for a place name information extraction method. The storing medium stored extraction programs provides the steps of; judging a place name type, which signifies a meaning role of a place name expression appeared in one of node pages of which a hypertext is composed, by detecting a clue expression which is possible to judge the place name type in the one of node pages, and detecting the place name expression in the one of node pages from a link source page or a link destination page of the one of node pages in which the clue expression appeared.

According to a thirty-fifth aspect of the present invention, there is provided a storing medium stored extraction programs for a place name information extraction method. The storing medium stored extraction programs provides the steps of; judging a place name type, which signifies a meaning role of a place name expression appeared in one of node pages of which a hypertext is composed, by judging a text type of a text of the one of node pages, and detecting the place name expression from the one of node pages.

According to a thirty-sixth aspect of the present invention, there is provided a storing medium stored extraction programs for a place name information extraction method. The storing medium stored extraction programs provides the steps of; detecting a place name expression from a text of node pages of which a hypertext is composed, investigating whether a group of node pages neighboring and including a node page in which the place name expression was detected satisfies a specific hypertext structure or not, and deciding a place name type, which signifies a meaning role of the place name expression appeared in the node page, of the place name expression included in the group of node pages that satisfied the specific hypertext structure.

According to a thirty-seventh aspect of the present invention, there is provided a map information retrieval apparatus. The map information retrieval apparatus provides a place name information extraction apparatus being one of claimed 4 to 12, storage in which information of a place name expression and its place name type, detected from hypertext database by the place name information extraction apparatus, is stored, an input means on which a user inputs information of his/her desiring place name expression and its place name type, a displaying means on which map information is displayed, and a retrieving means that retrieves a map database by making the place name expression inputted from the inputting means as a key, and reads map data of a region neighboring and including the place name expression, and also retrieves the storage by making the information of the place name expression and the place name type inputted from the inputting means as a key, and makes the displaying means display two retrieved results in a state that the two retrieved results are added.

BRIEF DESCRIPTION OF THE DRAWINGS

The objects and features of the present invention will become more apparent from the consideration of the following detailed description taken in conjunction with the accompanying drawings in which:

FIG. 1 is a diagram showing an example of a place name expression dictionary having co-occurrence word expressions;

FIG. 4 is a diagram showing an example of a clue expression dictionary at embodiments of the place name information extraction apparatus of the present invention;

FIG. 7 is a diagram showing an example of the contents of data storing in a work memory at the first embodiment of the place name information extraction apparatus of the present invention;

FIG. 8 is a diagram showing a text to be processed at the first embodiment of the place name information extraction apparatus of the present invention;

FIG. 11 is a diagram showing the contents of a hypertext being an object to be processed at a second embodiment of the place name information extraction apparatus of the present invention;

FIG. 12 is a diagram showing the contents of a hypertext of a node page 30 in FIG. 11 described by the HTML;

FIG. 17 is a flowchart showing processes at the step S135 in FIG. 15;

FIG. 18 is a diagram showing an example of the contents of data storing in a work memory 4 at the second embodiment of the place name information extraction apparatus of the present invention;

FIG. 19 is a diagram showing an example of the contents of data storing in the work memory in which a place name type was written at the second embodiment of the place name information extraction apparatus of the present invention;

FIG. 24 is a diagram showing the contents of a specific hypertext structure description dictionary at the third embodiment of the place name information extraction apparatus of the present invention;

FIG. 26 is a diagram showing the contents of a hypertext structure satisfying No. 1 of the rule number 34 shown in FIG. 24;

FIG. 29 is a flowchart showing processes at the step S174 of FIG. 28 in detail;

FIG. 32 is a diagram showing data contents of a position dependent contents database in FIG. 31;

FIG. 35 is a block diagram showing a second embodiment of the map information retrieval apparatus used the place name information extraction apparatus of the present invention.

DESCRIPTION OF THE PREFERRED EMBODIMENTS

Figure 2:
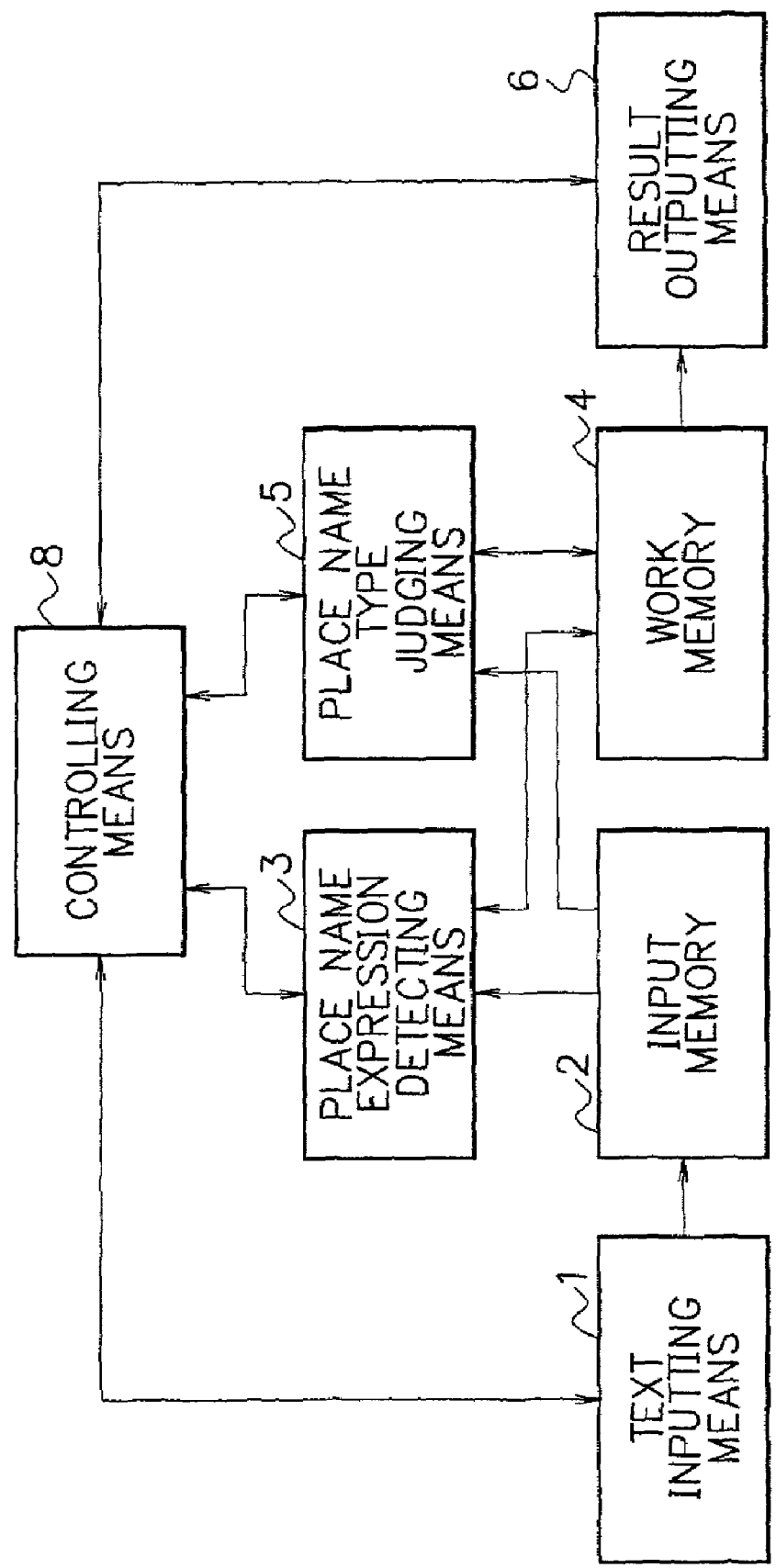
FIG. 2 is a block diagram showing a structure of a first embodiment of a place name information extraction apparatus of the present invention.

Referring now to the drawings, embodiments of the present invention are explained in detail. FIG. 2 is a block diagram showing a structure of a first embodiment of a place name information extraction apparatus of the present invention. As shown in FIG. 2, the first embodiment of the place name information extraction apparatus of the present invention consists of a text inputting means 1, an input memory 2, a place name expression detecting means 3, a work memory 4, a place name type judging means 5, a result outputting means 6, and a controlling means 8.

The text inputting means 1 reads a text in the input memory 2. The input memory 2 stores the text read by the text inputting means 1.

The place name expression detecting means 3 detects a place name expression from the text storing in the input memory 2, and write the detected place name expression and the information of its appeared position in the work memory 4. The place name expression detecting means 3 provides a place name expression dictionary such as the dictionary shown in FIG. 1, and detects a place name expression candidate appeared in the text and at the same time judges whether the place name expression candidate certainly expresses a place name or not. That is, the place name expression detecting means 3 detects co-occurrence words before and after the place name expression candidate in the text and co-occurrence words appeared in the same text by referring to the place name expression dictionary, with this, the vagueness of the place name expression candidate is removed. For example, when a co-occurrence word "player" appeared soon after a place name expression candidate "Chiba", this "Chiba" can be judged to be a person's name. And when a co-occurrence word "prefecture" or "city" appeared soon after the place name expression candidate "Chiba", this "Chiba" can be judged to be a place name.

The place name type judging means 5 judges the place name type of the place name expression by referring to the text storing in the input memory 2, and writes the judged result in the work memory 4.

The work memory 4 stores the place name expression and the information of its appeared position detected by the place name expression detecting means 3, and the information of the place name type of the place name expression judged at the place name type judging means 5.

The result outputting means 6 reads the contents in the work memory 4 and outputs the read result. The controlling means 8 controls a series of operation of the means and memories in the place name information extraction apparatus.

Each of these means can be realized by using a computer that is operated by program control. And as the input memory 2 and the work memory 4, the main memory of the computer can be used, but an external storage such as a magnetic disk and a magneto-optical disk can be also used.

The place name expression detecting means 3 corresponds to a conventional place name information extraction apparatus, and can be realized by the existing technology mentioned above. At the embodiments of the present invention, the place name type judging means 5 is provided, and this is different from the conventional place name information extraction apparatuses.

Figure 3:
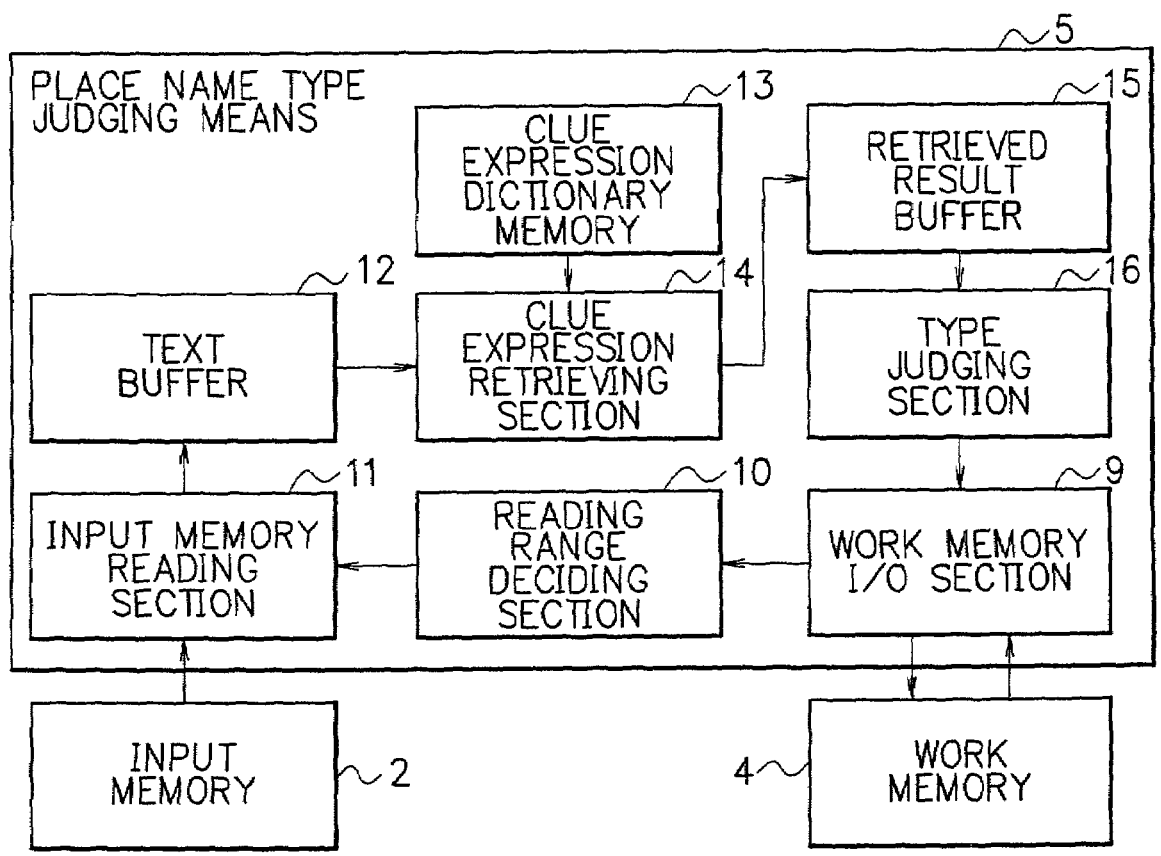
FIG. 3 is a block diagram showing a structure of a place name type judging means shown in FIG. 2.

FIG. 3 is a block diagram showing a structure of the place name type judging means 5 shown in FIG. 2 at the first embodiment of the place name information extraction apparatus of the present invention. Referring to FIG. 3, the structure of the place name type judging means 5 is explained in detail.

As shown in FIG. 3, the place name type judging means 5 consists of a work memory I/O section 9, a reading range deciding section 10, an input memory reading section 11, a text buffer 12, a clue expression dictionary memory 13, a clue expression retrieving section 14, a retrieved result buffer 15, and a type judging section 16.

The work memory I/O section 9 reads the place name expression and the information of its appeared position from the work memory 4, and transfers the read information to the reading range deciding section 10. And also the work memory I/O section 9 writes the judged result of the place name type of the place name expression outputted from the type judging section 16 in the work memory 4.

The reading range deciding section 10 decides the reading range of the text storing in the input memory 2, by the place name expression and the information of its appeared position that were read by the work memory I/O section 9.

The input memory reading section 11 reads the text in the range decided by the reading range deciding section 10 from the input memory 2, and transfers the read text to the text buffer 12.

The text buffer 12 stores temporarily the text read by the input memory reading section 11, and transfers the stored text to the clue expression retrieving section 14.

In the clue expression dictionary memory 13, a dictionary, in which clue expressions being clues at the time when the place name type of the place name expression is judged are registered, is stored. That is, this dictionary is a clue expression dictionary. FIG. 4 is a diagram showing an example of the clue expression dictionary at the embodiments of the place name information extraction apparatus of the present invention. As shown in FIG. 4, the clue expression dictionary provides a place name type column 20 and a clue expression column 21, and clue expressions for judging a place name type are described in the clue expression column 21 and correspond to each of the place name types in the place name type column 20. A place name type corresponding to a clue expression can be obtained by that the clue expression in the clue expression column 21 is found in the text.

The clue expression retrieving section 14 reads the decided range of the text from the text buffer 12 and also reads the clue expression dictionary shown in FIG. 4 from the clue expression dictionary memory 14, and retrieves the clue expression being the clue to judge the place name type of the place name expression appeared in the decided range of the text. And the clue expression retrieving section 14 judges the place name type from the clue expression retrieved by referring to the clue expression dictionary, and writes the judged result being the place name type in the retrieved result buffer 15.

When the place name type written in the retrieved result buffer 15 is one type, the type judging section 16 writes the place name type in the work memory 4 via the work memory I/O section 9 as it is. And when plural clue expressions were retrieved by the clue expression retrieving section 14, and plural place name types were written in the retrieved result buffer 15, the type judging section 16 executes a final judgment of the place name type for the place name expression. There are several methods executing the final judgment. As a first method, a clue expression, which was positioned at the nearest position of the place name expression, is obtained, and a place name type corresponding to the obtained clue expression is decided as the final place name type. As a second method, a place name type, which was retrieved at the most numerous times by the retrieved clue expression, is decided as the final place name type. And as a third method, when there is a possibility that plural place name types are supposed, it is judged that the final judgment cannot be made.

Figure 5:
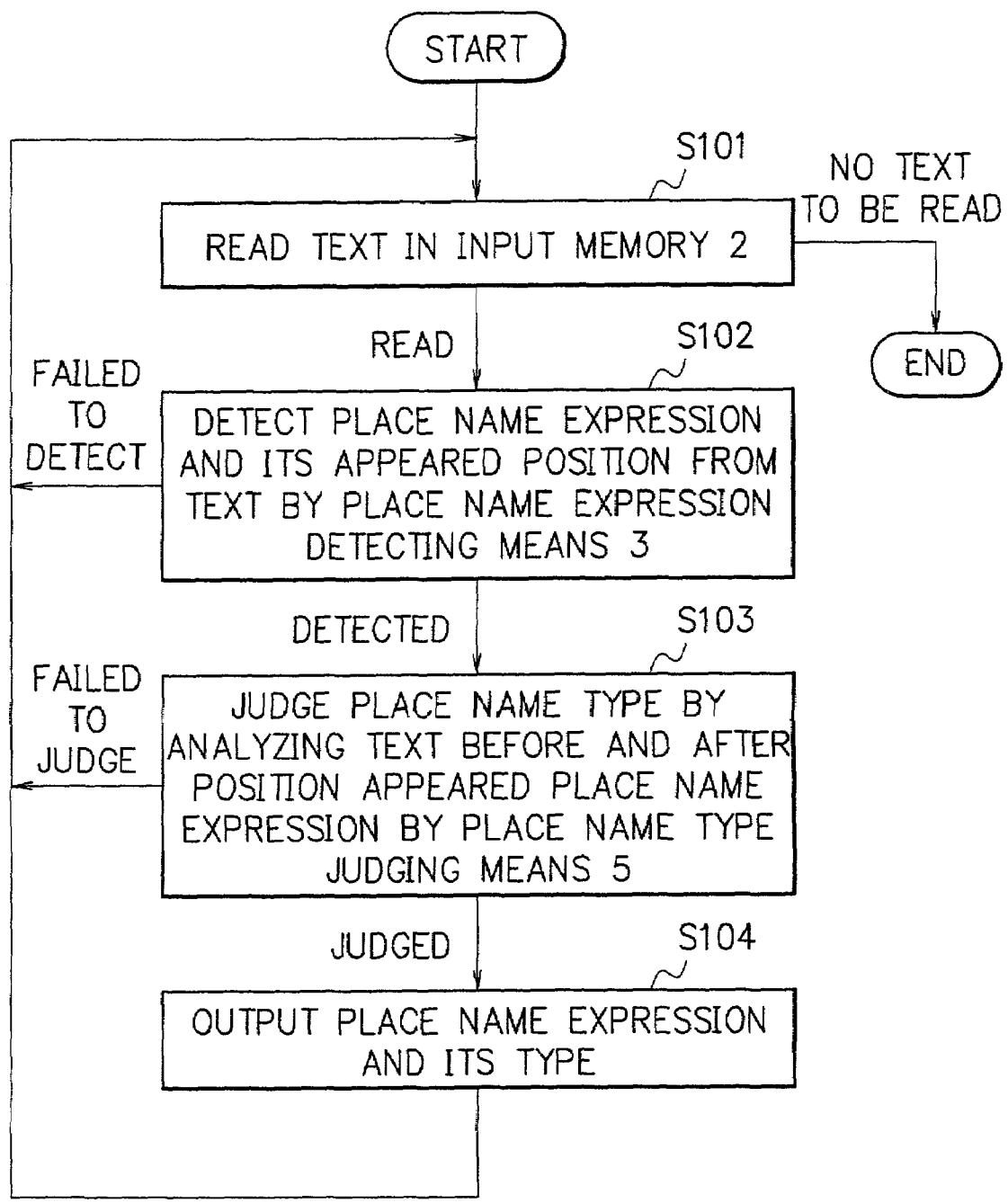
FIG. 5 is a flowchart showing a total operation at the first embodiment of the place name information extraction apparatus of the present invention.

FIG. 5 is a flowchart showing a total operation at the first embodiment of the place name information extraction apparatus of the present invention. Referring to drawings, the operation at the first embodiment of the place name information extraction apparatus of the present invention is explained.

First, referring to FIGS. 2 and 5, the total operation at the first embodiment of the place name information extraction apparatus of the present invention is explained. A text is read in the input memory 2 by the text inputting means 1 (step S101). After this, the place name expression detecting means 3 detects a place name expression and its appeared position from the text, and makes the work memory 4 store the detected result being the place name expression and the appeared position of the place name expression (step S102). The place name type judging means 5 analyzes the text before and after the appeared position of the place name expression, and judges the place name type of the place name expression, and writes the judged result being the place name type of the place name expression in the work memory 4 (step S103). And the result outputting means 6 outputs the place name expression and its place name type by obtaining from the work memory 4 (step S104).

Figure 6:
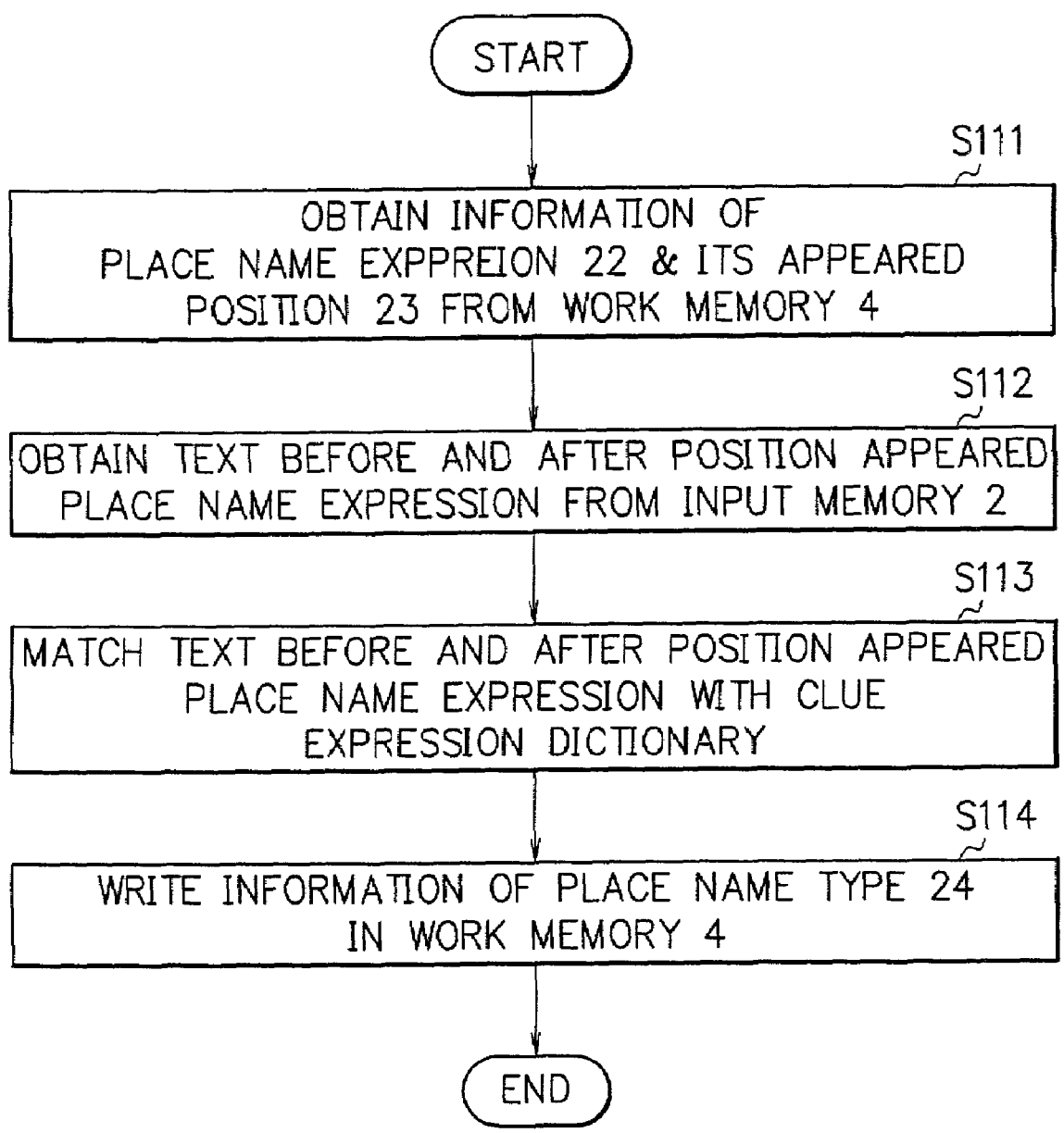
FIG. 6 is a flowchart showing processes at the place name type judging means being the step S103 in FIG. 5.

FIG. 6 is a flowchart showing processes at the place name type judging means 5 being the step S103 in FIG. 5 at the first embodiment of the place name information extraction apparatus of the present invention. FIG. 7 is a diagram showing an example of the contents of data storing in the work memory 4 at the first embodiment of the place name information extraction apparatus of the present invention. As shown in FIG. 7, the data in the work memory 4 provides a place name expression column 22, an appeared position column 23, and a place name type column 24.

Next, referring to FIGS. 3, 6, and 7, the operation of the place name type judging means 5 is explained in detail. First, the place name type judging means 5 obtains the information from the place name expression column 22 and the appeared position column 23 in the data of the work memory 4 (step S111). Actually, the work memory I/O section 9 reads the information of the place name expression and its appeared position from the work memory 4, and transfers the read information to the reading range deciding section 10.

Next, the place name type judging means 5 obtains the text before and after the position appeared the place name expression from the input memory 2 (step S112). Actually, the reading range deciding section 10 decides the range of the text before and after the appeared position of the place name expression to be read based on the information of the appeared position column 23 of the place name expression, and designates the reading range of the text to the input memory reading section 11. For example, the reading range may be ten letters (characters) before and after the place name expression, or a sentence, a clause, and a paragraph including the place name expression. The input memory reading section 11 reads the designated range of the text from the input memory 2 based on this reading range designation and writes the read range in the text buffer 12.

And the text before and after the appeared position of the place name expression is matched with the clue expression dictionary by obtaining from the clue expression dictionary memory 13 (step S113). Actually, the clue expression retrieving section 14 retrieves whether a clue expression, which is storing in the clue expression dictionary read from the clue expression dictionary memory 13, exists in the text read from the text buffer 12 or not. And the clue expression retrieving section 14 judges a place name type from the retrieved clue expression, and writes the retrieved result being the place name type in the retrieved result buffer 15.

And the information of the place name type column 24 is written in the work memory 4 (step S114). Actually, the type judging section 16 judges a final place name type of the place name expression and writes the final place name type in the work memory 4 via the work memory I/O section 9. When the place name type read from the retrieved result buffer 15 is one type, the type judging section 16 writes the place name type as it is in the work memory 4 via the work memory I/O section 9. And when plural clue expressions are retrieved at the clue expression retrieving section 14, and the plural place name types are written in the retrieved result buffer 15, the type judging section 16 judges a final place name type from the plural place name types written in the retrieved result buffer 15, and writes the final place name type in the work memory 4 via the work memory I/O section 9. There are several methods executing the final judgment. As a first method, a clue expression, which was positioned at the nearest position of the place name expression, is obtained, and a place name type corresponding to the obtained clue expression is decided as the final place name type. As a second method, a place name type, which was retrieved at the most numerous times by the retrieved clue expression, is decided as the final place name type. And as a third method, when there is a possibility that plural place name types are supposed, it is judged that the final judgment cannot be made.

In this, at the step S113, when the matching with the clue expression dictionary failed, at the step S114, the result being that the judgement failed is written in the work memory 4.

In this, the operation mentioned above is explained in detail by using a concrete example. FIG. 8 is a diagram showing a text to be processed at the first embodiment of the place name information extraction apparatus of the present invention.

It is assumed that a text "the last Olympic Games in the 20th century will be held at Sydney for 17 days from Sep. 15, 2000 through Nov. 1, 2000." shown in FIG. 8 is stored in the input memory 2.

First, the place name expression detecting means 3 reads the text shown in FIG. 8 from the input memory 2, and detects a place name expression appeared in the text. As shown in FIG. 7, the information of "Sydney" as a place name expression and "48th letter to 53rd letter" as an appeared position of the place name expression "Sydney" are written in the work memory 4.

Next, the place name type judging means 5 retrieves a clue expression being the clue for the place name expression by retrieving the designated range of the object text, and judges a place name type from the retrieved result. At this example, the place name expression "Sydney" and the appeared position "48th letter to 53rd letter" are read in the reading range deciding section 10 by the work memory I/O section 9. And based on an instruction from the reading range deciding section 10, "will be held" and "for 17 days" positioning before and after "Sydney" in the text are read in the text buffer 12 by the input memory reading section 11. In this, about 10 letters are read before and after the place name expression "Sydney", however, the number of letters are not limited to about 10, and an arbitrary number can be used, and further a sentence, a clause, or a paragraph instead of letters can be used.

Figures 9, 10:
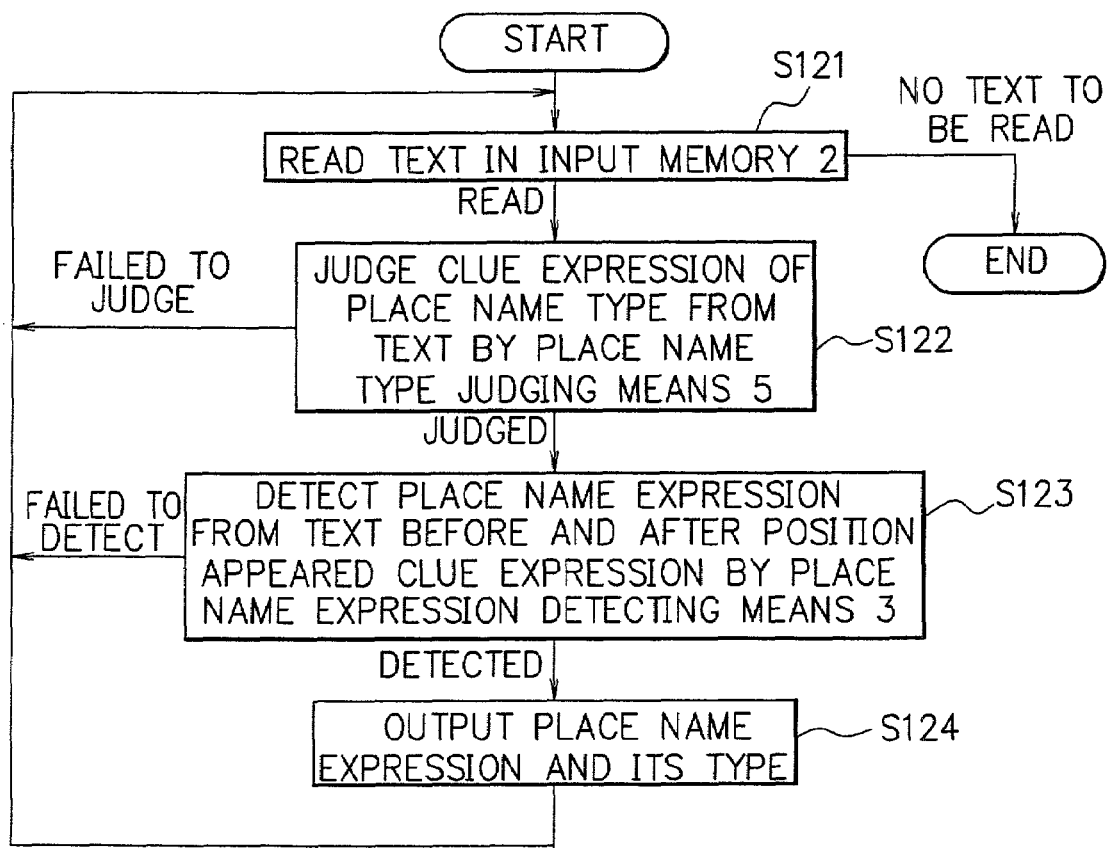
FIG. 9 is a diagram showing an example of the contents of data storing in the work memory in which a place name type was written at the first embodiment of the place name information extraction apparatus of the present invention.
FIG. 10 is a flowchart showing an operation at an alternative example at the first embodiment of the place name information extraction apparatus of the present invention.

And the clue expression retrieving section 14 retrieves whether a clue expression storing in the clue expression dictionary in the clue expression dictionary memory 13 appears or not in the read text before and after the place name expression "Sydney". At this example, a clue expression "be held" is found in the read text. The clue expression retrieving section 14 chooses "event site" as the place name type from the clue expression "be held ", and writes the chosen result being the place name type in the retrieved result buffer 15. The type judging section 16 writes the place name type in the work memory 4 via the work memory I/O section 9. FIG. 9 is a diagram showing an example of the contents of data storing in the work memory 4 in which the place name type was written at the first embodiment of the place name information extraction apparatus of the present invention. As shown in FIG. 9, the information "Sydney" in the place name expression column 22, "48th letter to 53rd letter" in the appeared position column 23, and "event site" in the place name type column 24 are written in the work memory 4.

Next, an alternative example of the first embodiment of the place name information extraction apparatus of the present invention is explained. First, a clue expression being the clue for the place name type of a place name expression is detected from the text storing in the input memory 2. And the place name expression detecting means 3 detects the place name expression from the text before and after the appeared position of the detected clue expression. This alternative example is also workable. And the place name expression and its place name type on the text can be detected with high accuracy even by this alternative example.

This alternative example of the first embodiment can be realized by the same structure that the first embodiment of the place name information extraction apparatus of the present invention shown in FIG. 2 has. And also the structure of the place name type judging means 5 shown in FIG. 3 is the same that the first embodiment has. However, at this alternative example, the operation starts to work before that the place name expression has not been detected yet, therefore the reading range deciding section 10 merely reads the object text, by not deciding the reading range of the object text based on the position information of the place name expression.

FIG. 10 is a flowchart showing an operation at the alternative example at the first embodiment of the place name information extraction apparatus of the present invention. Referring to FIGS. 2 and 10, the operation of the alternative example at the first embodiment of the place name information extraction apparatus of the present invention is explained.

First, a text is read in the input memory 2 (step S121). And the place name type judging means 5 judges a clue expression being a clue for the place name type of a place name expression in the text storing in the input memory 2 (step S122). And the place name expression detecting means 3 detects a place name expression from the text before and after the appeared position of the clue expression (step S123). And the place name expression and its place name type are outputted from the work memory 4 by the result outputting means 6 (step S124).

At the flowchart at the first embodiment shown in FIG. 5, the place name expression detecting means 3 detects a place name expression, and after this, the place name type judging means 5 retrieves a clue expression and judges its place name type. However, at the flowchart at the alternative example of the first embodiment shown in FIG. 10, first, the place name type judging means 5 judges a clue expression, and after this, the place name expression detecting means 3 detects the place name expression. Therefore, when the text "the last Olympic Games in the 20th century will be held at Sydney for 17 days from Sep. 15, 2000 through Nov. 1, 2000." shown in FIG. 8 is used as the text, at the flowchart shown in FIG. 10, at the step S122, "be held" is detected as the clue expression, and at the step S123, "Sydney" being the place name expression is detected from the text before and after the clue expression "be held."

Next, referring to the drawings, a second embodiment of the place name information extraction apparatus of the present invention is explained. At the first embodiment, an individually independent text so called a plain text was handled as the object to be processed at the place name information extraction apparatus. However, at the second embodiment, a hypertext instead of the plain text is an object to be processed.

Before explaining the second embodiment, first, the hypertext being the object to be processed is explained. FIG. 11 is a diagram showing the contents of a hypertext being the object to be processed at the second embodiment of the place name information extraction apparatus of the present invention. At the hypertext, one node page is one unit in a text, and the text is composed of node pages, and a link is formed between the node pages. In FIG. 11, a hypertext consists of one node page 30 and one node page 31, and a link 33 shown by an arrow connects the node pages 30 and 31. When focusing on the link 33, the node page 30 is a link source page and the node page 31 is a link destination page. Some hypertext has its own structure, however, recently, markup languages such as the standard generalized markup language (SGML), the hypertext markup language (HTML), and the extensible markup language (XLM) have been widely used for the description of the hypertext. Especially, a huge size hypertext exists in the WWW on the Internet, and the description by the HTML is now the standard in it.

FIG. 12 is a diagram showing the contents of the hypertext of the node page 30 in FIG. 11 described by the HTML at the second embodiment of the place name information extraction apparatus of the present invention. In FIG. 12, parts in parentheses <> are markup tags, and a character string parenthesized by A tags shows a link source key character string at the HTML. That is, a character string "Event in September" in FIGS. 11 and 12 is the link source key character string. And an HTML text name written right after HREF in the A tags signifies a link destination node page. That is, the link source key character string "Event in September" in the node page 30 in FIG. 11 can jump to an HTML text named "Event09" being the node page 31 in FIG. 11. In this, the hypertext described by the HTML was explained, however, at the present invention, the description format of the hypertext to be processed is not limited to the HTML, and a hypertext described by the SGML, or the XML can be used, and also a hypertext having its own data structure can be used.

Next, the structure of the second embodiment of the place name information extraction apparatus of the present invention is explained. The structure of the second embodiment is the same that of the first embodiment shown in FIG. 2 has. However, the object to be processed is changed to a hypertext from a plain text at the second embodiment, therefore at the text inputting means 1 and the place name type judging means 5, processes being proper to the hypertext are added. And the place name expression detecting means 3 processes node pages of the hypertext read in the input memory 2, by regarding the hypertext as the plain text, therefore the processes are the same as at the first embodiment.

At the text inputting means 1, since the object to be inputted is changed to the hypertext from the plain text, a function, which decides the text of a node page to be read next by tracing a link of the hypertext, must be added. That is, when a node page already read in the input memory 2 exists, a link source page or a link destination page of the node page in the input memory 2 is traced as a node page to be read next. The function for deciding a node page (text) to be read next by tracing the link in order has been realized by the WWW browser being widely used such as the Netscape Navigator and the Microsoft Internet Explore, or by automatic collecting tools of the WWW pages called such as the Auto Pilot and the WWW Robot.

Next, at the place name type judging means 5, a place name type judging method, which utilizes a specific structure at the hypertext described by a markup language such as the HTML, is applied. That is, there are two methods, one is that the place name type is judged by that a text type of the read hypertext is made to be the base, and the other is that the place name type is judged by that the contents of the link source page or the link destination page of the object text are made to be a clue.

Figure 13:
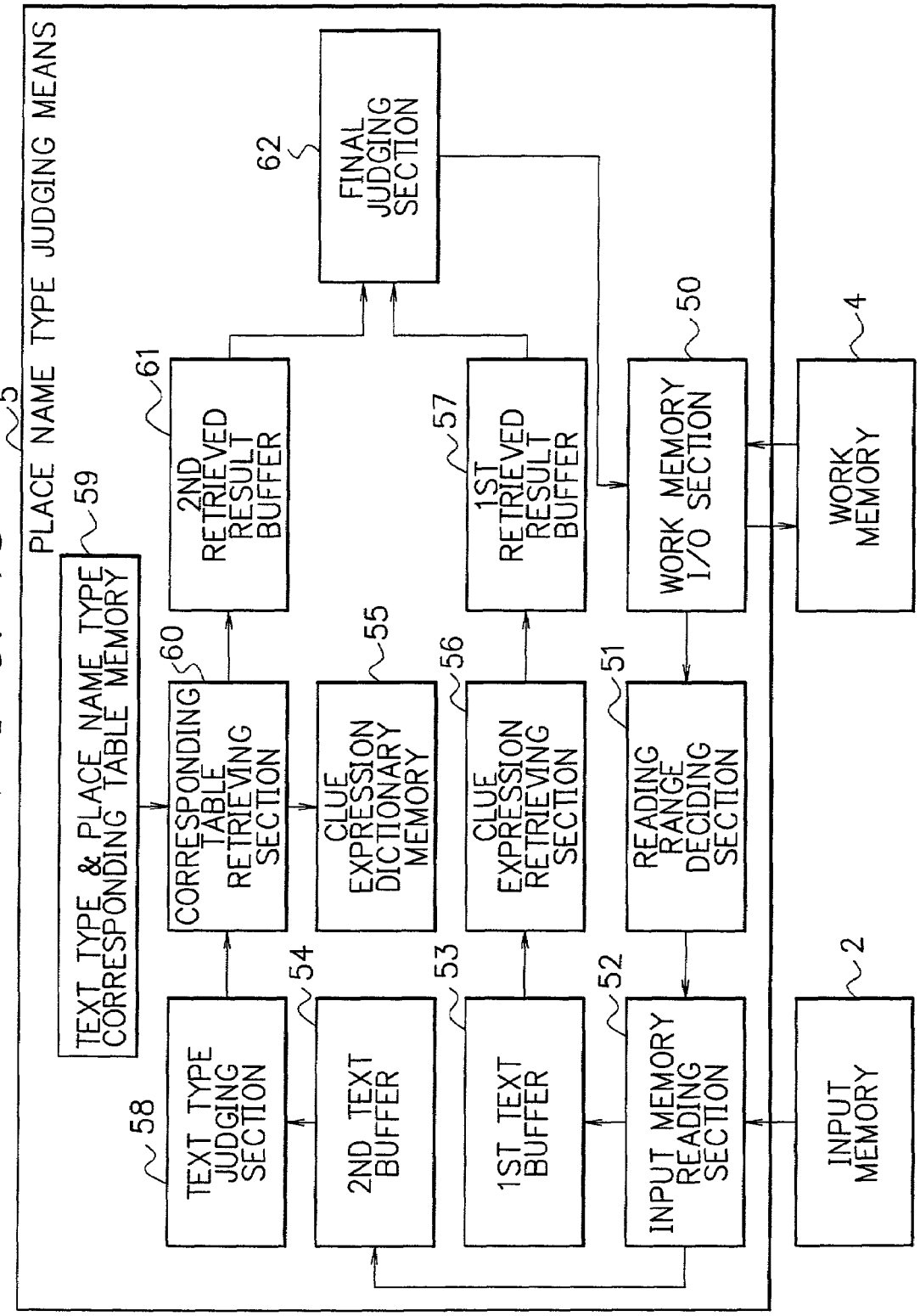
FIG. 13 is a block diagram showing a structure of a place name type judging means at the second embodiment of the place name information extraction apparatus of the present invention.

FIG. 13 is a block diagram showing a structure of the place name type judging means 5 at the second embodiment of the place name information extraction apparatus of the present invention. Referring to FIG. 13, the structure of the place name type judging means 5 at the second embodiment of the place name information extraction apparatus of the present invention is explained in detail.

As shown in FIG. 13, the place name type judging means 5 at the second embodiment of the place name information extraction apparatus of the present invention consists of a work memory I/O section 50, a reading range deciding section 51, an input memory reading section 52, a first text buffer 53, a second text buffer 54, a clue expression dictionary memory 55, a clue expression retrieving section 56, a first retrieved result buffer 57, a text type judging section 58, a text type and place name type corresponding table memory 59, a corresponding table retrieving section 60, a second retrieved result buffer 61, and a final judging section 62.

The work memory I/O section 50 reads the information of the place name expression and its appeared position from the work memory 4, and transfers the read information to the reading range deciding section 51. And also the work memory I/O section 50 writes the judged result of the place name type outputted from the final judging section 62 in the work memory 4.

The reading range deciding section 51 decides the reading range of the node page storing in the input memory 2, by the information of the place name expression and its appeared position, read by the work memory I/O section 50. In this, at the second embodiment, there is a case that a node page reading in the first text buffer 53 and a node page reading in the second text buffer 54 are different, not depending on the decided result at the reading range deciding section 51.

The input memory reading section 52 reads the node page in the range decided by the reading range deciding section 51 from the input memory 2, and transfers the node page in the decided range to a designated text buffer, that is, the first text buffer 53 and the second text buffer 54.

The first text buffer 53 stores temporarily the node page read by the input memory reading section 52, and transfers the stored node page to the clue expression retrieving section 56.

The second text buffer 54 stores temporarily the node page read by the input memory reading section 52, and transfers the stored node page to the text type judging section 58.

In the clue expression dictionary memory 55, a dictionary, in which clue expressions being clues at the time when the place name type is judged are registered, is stored. That is, this dictionary is a clue expression dictionary.

The clue expression retrieving section 56 reads the decided range of the node page from the first text buffer 53 and also reads the clue expression dictionary from the clue expression dictionary memory 55, and retrieves the clue expression being the clue to judge the place name type appeared in the decided range of the node page. And the clue expression retrieving section 56 judges the place name type from the clue expression retrieved by referring to the clue expression dictionary, and writes the judged result being a place name type candidate in the first retrieved result buffer 57.

The text type judging section 58 reads the decided range of the node page from the second text buffer 54, and analyses the node page and judges its text type. The judging method of a text type can be realized by an existing technology described in Japanese Patent Application Laid-Open No. 2000-29902 "structured document sorting apparatus and storing medium stored computer programs to realize the apparatus, and structured document retrieving system and storing medium stored computer programs to realize the system". At this existing technology, a text type (for example, the Web site (home page) of a company, an event information page, a product catalogue page, and so on) can be automatically judged by focusing on features such as tag information, URL character strings, and keywords in a markup text such as by the HTML and so on.

Figure 14:
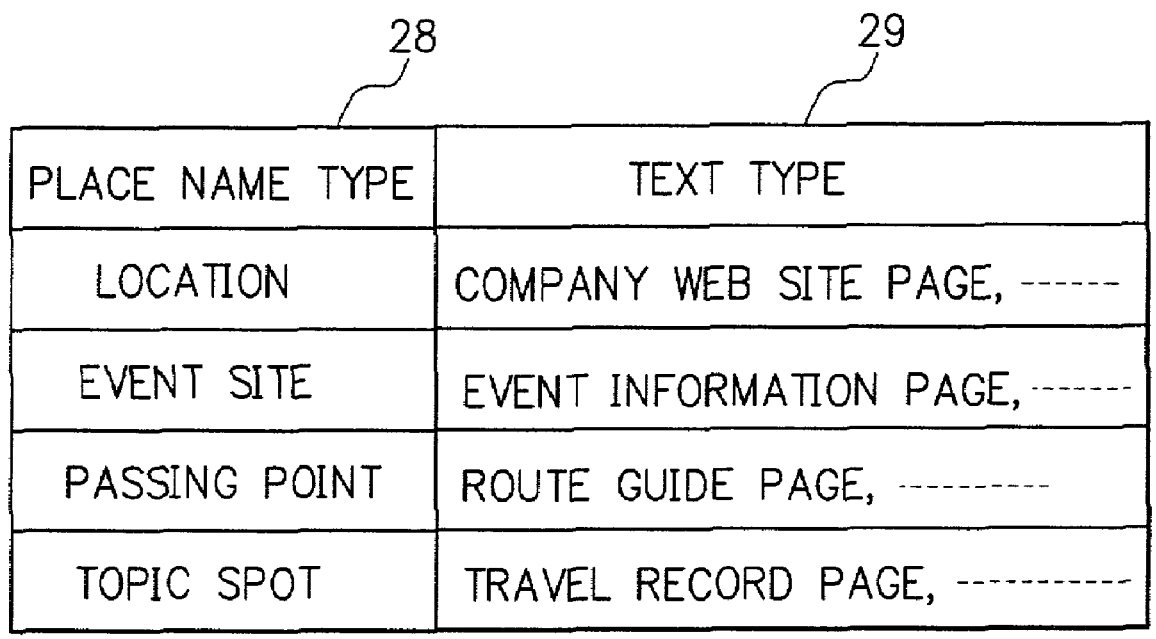
FIG. 14 is a table showing the correspondence between a text type and a place name type in the place name type judging means at the embodiments of the place name information extraction apparatus of the present invention.

FIG. 14 is a table showing the correspondence between a text type and a place name type in the place name type judging means 5 at the embodiments of the place name information extraction apparatus of the present invention. In the text type and place name type corresponding table memory 59, this table shown in FIG. 14 is stored. Hereinafter, this table is referred to as a text type and place name type corresponding table. As shown in FIG. 14, the text type and place name type corresponding table consists of a place name type column 28 and a text type column 29. For example, when a text type is judged as a company Web site page (home page), its place name type in the text is judged to be "location ", and when a text type is judged as an event information page, its place name type in the text is judged to be "event site".

The corresponding table retrieving section 60 detects a place name type corresponding to the text type judged at the text type judging section 58 from the text type and place name type corresponding table. The detected place name type is registered in the second retrieved result buffer 61 as its place name type candidate.

The final judging section 62 judges a final place name type based on the place name type candidate storing in the first retrieved result buffer 57, which was judged based on the clue expression, and the place name type candidate storing in the second retrieved result buffer 61, which was judged based on the text type.

In this, the retrieval of the clue expression by the clue expression retrieving section 56 is executed from the whole text of the link source page, however the clue expression can be detected from the link source key character string by extracting from the link source page. Or the clue expression can be extracted from a text in a certain range before and after the link source key character string, or from both of the link source page and the link destination page of the node page in which the place name expression appeared.

Figure 15:
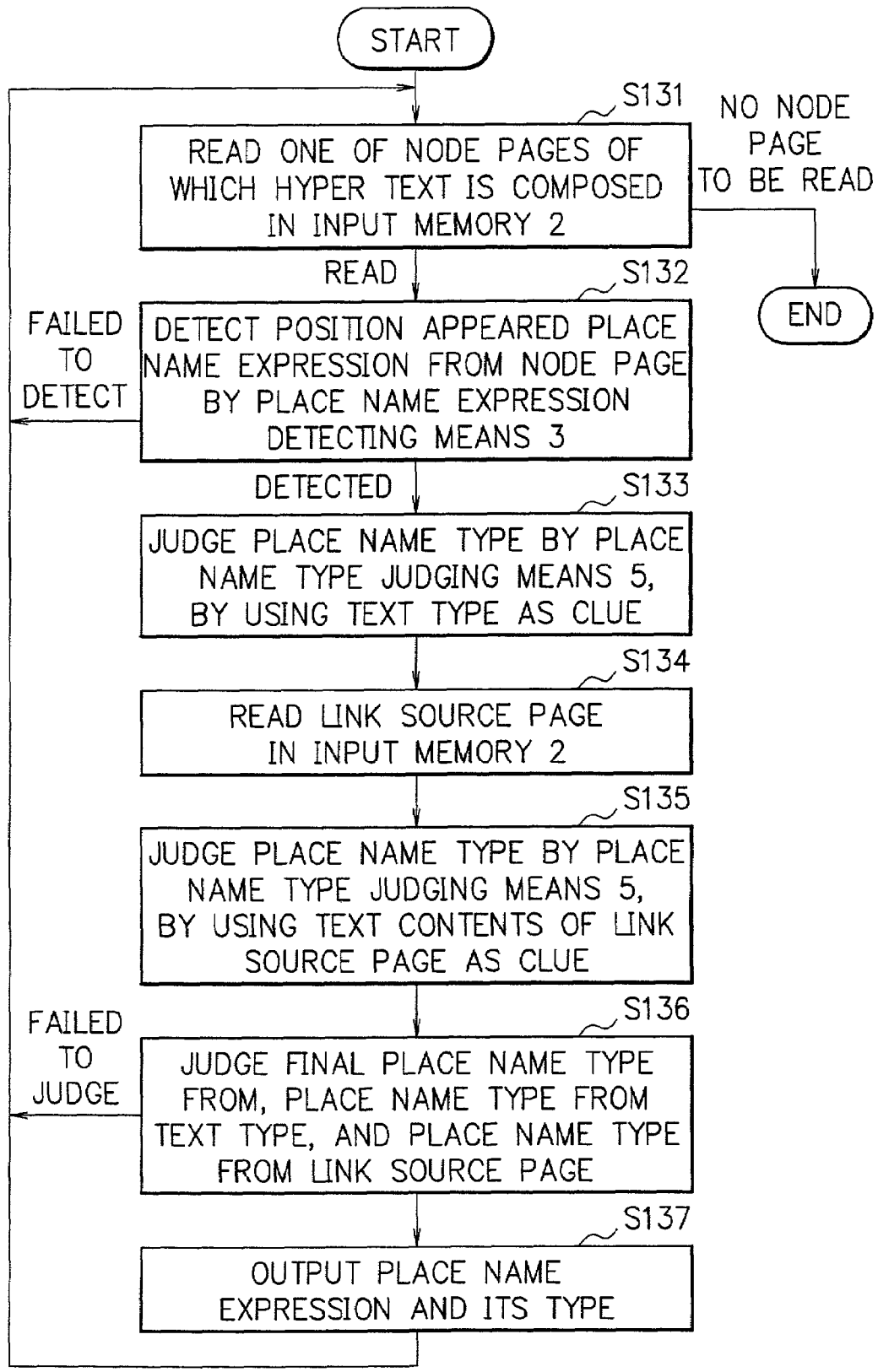
FIG. 15 is a flowchart showing a total operation at the second embodiment of the place name information extraction apparatus of the present invention.

Next, referring to the drawings, an operation of the second embodiment of the place name information extraction apparatus of the present invention, in which a hypertext is the object to be processed, is explained. FIG. 15 is a flowchart showing a total operation at the second embodiment of the place name information extraction apparatus of the present invention. Referring to FIGS. 2, 13, and 15, the total operation of the second embodiment of the place name information extraction apparatus of the present invention is explained.

First, the text inputting means 1 reads one of node pages, of which a hypertext is composed, in the input memory 2 (step S131). And the place name expression detecting means 3 detects the position appeared the place name expression from the node page in the input memory 2 (step S132). And the place name type judging means 5 judges a place name type of the place name expression by that a text type of the text of the node page in the input memory 2 is made to be a clue (step S133). A link source page of the node page in the input memory 2 is read in the input memory 2 (step S134). In this, when plural link source pages exist, the plural link source pages are read. And the place name type judging means 5 judges a place name type of the place name expression by that the contents of the text of the link source page read in the input memory 2 is made to be a clue (step S135). And a final place name type of the place name expression is judged by considering the place name type candidates detected at the steps S 133 and S135 (step S136). And the place name expression and its final place name type are outputted (step S137).

Figure 16:
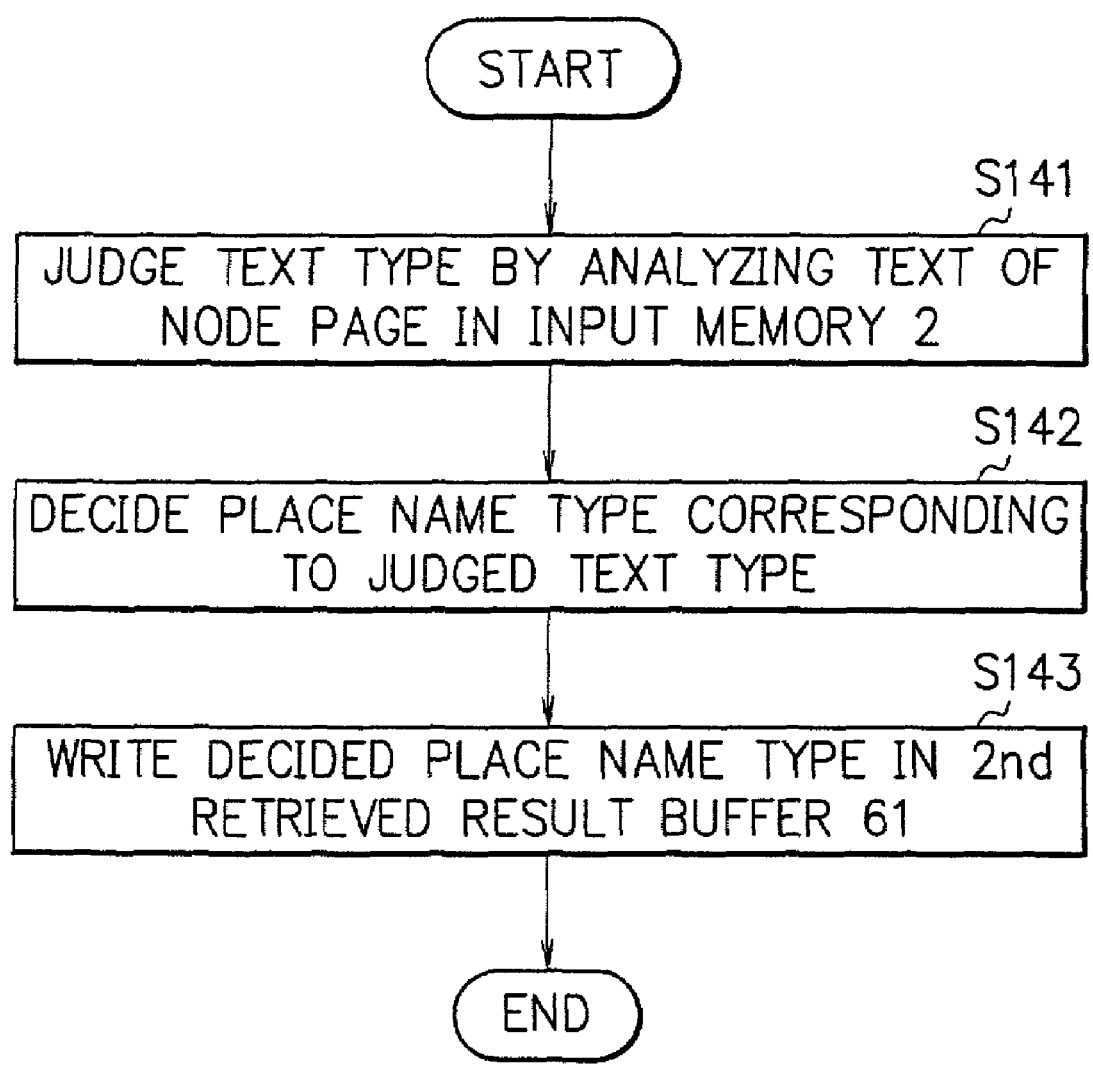
FIG. 16 is a flowchart showing processes at the step S133 in FIG. 15.

FIG. 16 is a flowchart showing processes at the step S133 in FIG. 15 at the second embodiment of the place name information extraction apparatus of the present invention. Referring to FIGS. 13, 14, and 16, the processes at the step S133, that is, a method to realize a part of the place name type judging means 5, at the second embodiment of the place name information extraction apparatus of the present invention, is explained in detail.

First, the text of the node page in the input memory 2 is analyzed and its text type is judged (step S141). Actually, the text type judging section 58 reads the node page from the second text buffer 54, and judges the text type of the text of this node page. As a judging method of the text type, there is a method in which a text type (for example, a company Web site page (home page), an event information page, a product catalogue page, and so on) is judged by focusing on features such as tag information, URL character strings, and keywords in a markup text such as by the HTML and so on.

Next, a place name type corresponding to the judged text type is decided (step S142). Actually, the corresponding table retrieving section 60 retrieves a place name type corresponding to the text type judged by the text type judging section 58 by referring to the text type and place name type corresponding table. As shown in FIG. 14, at the text type and place name type corresponding table, when the text type is judged as an event information page, the place name type in the text can be judged to be "event site".

And the corresponding table retrieving section 60 writes the place name type, retrieved from the text type and place name type corresponding table, in the second retrieved result buffer 61 as a place name type candidate (step S143).

When the text type could not be judged at the step S141, and also the place name type corresponding to the text type did not exist at the step S142, at the step S143, the result that the judgement failed is written in the second retrieved result buffer 61.

FIG. 17 is a flowchart showing processes at the step S135 in FIG. 15 at the second embodiment of the place name information extraction apparatus of the present invention. Referring to FIGS. 13 and 17, the processes at the step S135 in FIG. 15, that is, a method to realize a part of the place name type judging means 5, at the second embodiment of the place name information extraction apparatus of the present invention, is explained in detail.

First, a link source page of a node page, in which a place name expression appeared, is read from the input memory 2 (step S151). Actually, the reading range deciding section 51 designates the link source page of the node page, in which the place name expression appeared, based on the information of the position appeared the place name expression read from the work memory 4. And the input memory reading section 52 reads this designated link source page from the input memory 2 and writes this read link source page in the first text buffer 53.

Next, a link source key character string is detected from the link source page and the link source key character string is matched with the clue expression dictionary (step S152). Actually, the clue expression retrieving section 56 reads the link source page from the first text buffer 53 and also the clue expression dictionary from the clue expression dictionary memory 55, and retrieves a clue expression registering in the clue expression dictionary from the a link source key character string of the read link source page. And the clue expression retrieving section 56 judges a place name type from the retrieved clue expression, referring to the clue expression dictionary. In this, in order to extract the link source key character string, the tag information of the link source page is focused on. At an HTML text, a character string parenthesized by A tags of a link source page is the link source key character string. And in this, the link source key character string is extracted from the link source page.

However, at retrieving the clue expression, the clue expression can be retrieved from the whole link source page instead of the link source key character string, or from a text of a certain range before and after the link source key character string.

The clue expression retrieving section 56 writes the judged place name type in the first retrieved result buffer 57 as a place name type candidate (step S153).

When the link source page could not be read at the step S151, and also the clue expression could not be retrieved at the step S152, at the step S153, the result that the judgement failed is written in the first retrieved result buffer 57.

Next, the operation of the second embodiment shown in FIG. 15 is explained in detail by using a concrete example being the hypertext shown in FIG. 11. FIG. 18 is a diagram showing an example of the contents of data storing in the work memory 4 at the second embodiment of the place name information extraction apparatus of the present invention.

Referring to FIGS. 2, 11, 13, 14, 15, and 18, the operation of the second embodiment of the place name information extraction apparatus of the present invention is explained in detail. First, at the step S131, the node page 31 in FIG. 11 is read in the input memory 2. At the step S132, "N Corporation Building, Minato Ward, Tokyo" (49th letter to 85th letter of the node page 31) is detected as a place name expression. As shown in FIG. 18, "N Corporation Building, Minato Ward, Tokyo" is written in the place name expression column 22, and "Node Page 31, 49th letter to 85th letter" is written in the appeared position column 23 in the work memory 4 by the place name expression detecting means 3.

At the step S133, a text type of the node page 31 is judged and a place name type is judged based on the text type. The text type judging section 58 reads the node page 31 from the second text buffer 54 and judges the text type of the node page 31. The corresponding table retrieving section 60 retrieves a place name type corresponding to the text type judged at the text type judging section 58 by using the text type and place name type corresponding table. The retrieved place name type is written in the second retrieved result buffer 61 as a place name type candidate. When the text type of the node page 31 shown in FIG. 11 was judged to be "event information page", the place name type is judged to be "event site" by the text type and place name type corresponding table shown in FIG. 14. The Judged result being the place name type is stored in the second retrieved result buffer 61 as a place name type candidate.

At the step S134, the node page 30 being the link source page of the node page 31 is read in the input memory 2.

At the step S135, a place name type of the place name expression is judged that the link source key character string 32 "Event in September" of the node page 30 is made to be a clue. The clue expression retrieving section 56 detects the link source key character string 32 "Event in September" from the node page 30 being the link source page written in the first text buffer 53, and matches this "Event in September" with the clue expression dictionary. As the result of matching, a clue expression "event" is detected, and a place name type corresponding to the clue expression "event" is judged to be "event site", as shown in FIG. 4. This judged result being the place name type is written in the first retrieved result buffer 57 as a place name type candidate.

At the step S136, since the place name type candidate "event site" retrieved by the corresponding table retrieving section 60 and the place name type candidate "event site" retrieved by the clue expression retrieving section 56 are the same, the final judging section 62 judges the place name type to be "event site".

FIG. 19 is a diagram showing an example of the contents of data storing in the work memory 4 in which the place name type was written at the second embodiment of the place name information extraction apparatus of the present invention. At the step S137, as shown in FIG. 19, "N Corporation Building, Minato Ward, Tokyo" is written in the place name expression column 22, "Node Page 31, 49th letter to 85th letter" is written in the appeared position column 23, and "event site" is written in the place name type column 24 in the work memory 4.

At the second embodiment mentioned above, a judgement, in which a place name type is judged by that a clue expression appeared in a node page is detected, and a judgement, in which a place name type is judged by that a text type of the node page is judged, are executed at the same time, and a final place name type is judged based on these two judged results. However, first, a place name type is judged by that a text type is judged, and when this judgment of the text type failed, a clue expression appeared in the text is detected and the place name type is judged by only the clue expression, this judgment is usable. And either one of the judgments by the text type and the clue expression is executed, and the place name type is judged, this judgment is also usable.

For example, when a method, in which only the text type is made to be a clue for judging the place name type, is used, in the structure of the place name type judging means 5 mentioned at FIG. 13, the first text buffer 53, the clue expression dictionary memory 55, the clue expression retrieving section 56, and the first retrieved result buffer 57 are not needed. And when a method, in which only the clue expression is made to be a clue for judging the place name type, is used, the second text buffer 54, the text type judging section 58, the text type and place name type corresponding table memory 59, the corresponding table retrieving section 60, and the second retrieved result buffer 61 are not needed. And also at the flowchart shown in FIG. 15, there are several alternatives, that is, the step S133 can be executed after the step S135, or one of the step S133 and the steps of S134 and S135 is deleted, or when the process at the step S133 was successful, the steps S134 and S135 are skipped.

At the first embodiment, there were two method, that is, one is that the place name type is judged after the place name expression was detected as shown in FIG. 5, and the other is that the place name expression is detected after the clue of the place name type was obtained as shown in FIG. 10. At the second embodiment, as the same as the first embodiment, there are two methods. The flowchart shown in FIG. 15 signifies that the place name type is judged after the place name expression was detected.

Figure 20:
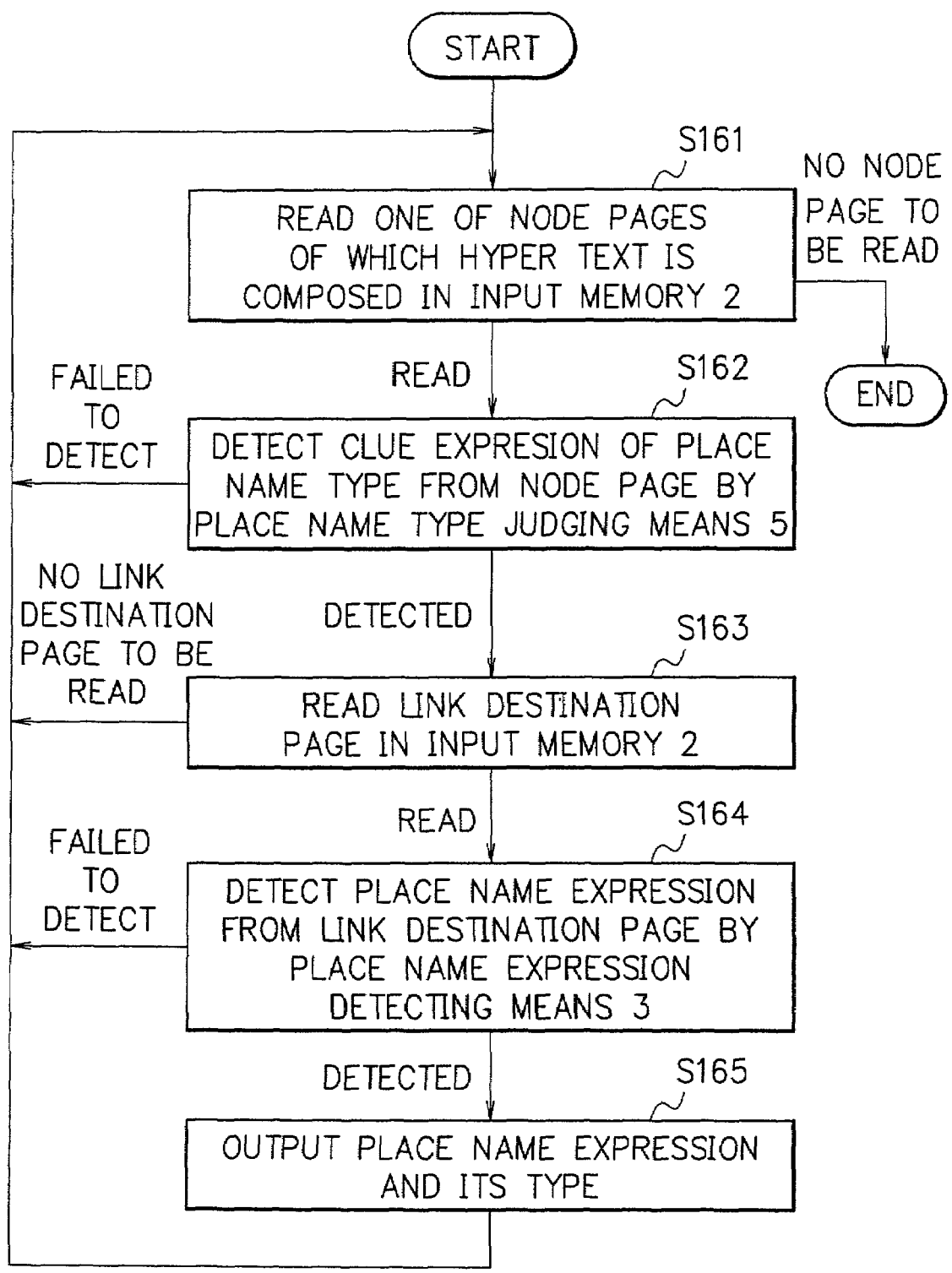
FIG. 20 is a flowchart showing a total operation at one alternative at the second embodiment of the place name information extraction apparatus of the present invention.

Next, referring to the drawings, at the second embodiment, a method that the place name expression is detected after the clue of the place name type was obtained is explained. FIG. 20 is a flowchart showing a total operation at one alternative at the second embodiment of the place name information extraction apparatus of the present invention. And FIG. 21 is a flowchart showing a total operation at the other alternative at the second embodiment of the place name information extraction apparatus of the present invention.

First, referring to FIGS. 2 and 20, one alternative operation at the second embodiment of the place name information extraction apparatus of the present invention is explained. First, one of node pages of which a hypertext is composed is read in the input memory 2 (step S161). Next, the place name type judging means 5 detects a clue expression for the place name type from the node page in the input memory 2 (step S162). And a link destination page for the node page in the input memory 2 is read in the input memory 2 (step S163). At this time, when plural link destination pages exist, a link destination page in which the clue expression of the place name type is included in its link source key character string is chosen. In this, when this link destination page does not exist, a link destination page, in which the clue expression exists at the nearest position of the link source key character string, is chosen. And the place name expression detecting means 3 detects a place name expression from the link destination page in the input memory 2 (step S164). And the place name expression and its place name type are written in the work memory 4 (step S165). In this, when plural clue expressions exist in the node page and these clue expressions are set in the link source key character strings, the place name expression is detected by that all of the link destinations of these clue expressions are referred.

Referring to FIGS. 2, 11, and 20, one alternative operation at the second embodiment of the present invention is explained in detail. First, at the step S161, the node page 30 in FIG. 11 is read in the input memory 2. At the step S162, "Event" is detected as a clue expression from the node page 30. In the node page 30, there are plural "Event", but at the step S163, the node page 31 being the link destination page of the first "Event in September" 32 in the node page 30 is read. At the step S164, "N corporation Building, Minato Ward, Tokyo" is detected as a place name expression from the node page 31 being the link destination page. At the step S165, the place name expression "N corporation Building, Minato Ward, Tokyo", the appeared position "Node page 31, 49th letter to 85th letter", and the place name type "Event Site" are written in the work memory 4. In the node page 30 shown in FIG. 11, there are plural clue expressions "Event in September", "Event in October", and "Event in November", however, in FIG. 11, only the node page 31 being the link destination page of "Event in September" is described. However, in case that there are link destination pages for "Event in October" and "Event in November", respective link destination pages are referred and a place name expressions is detected.

Figure 21:
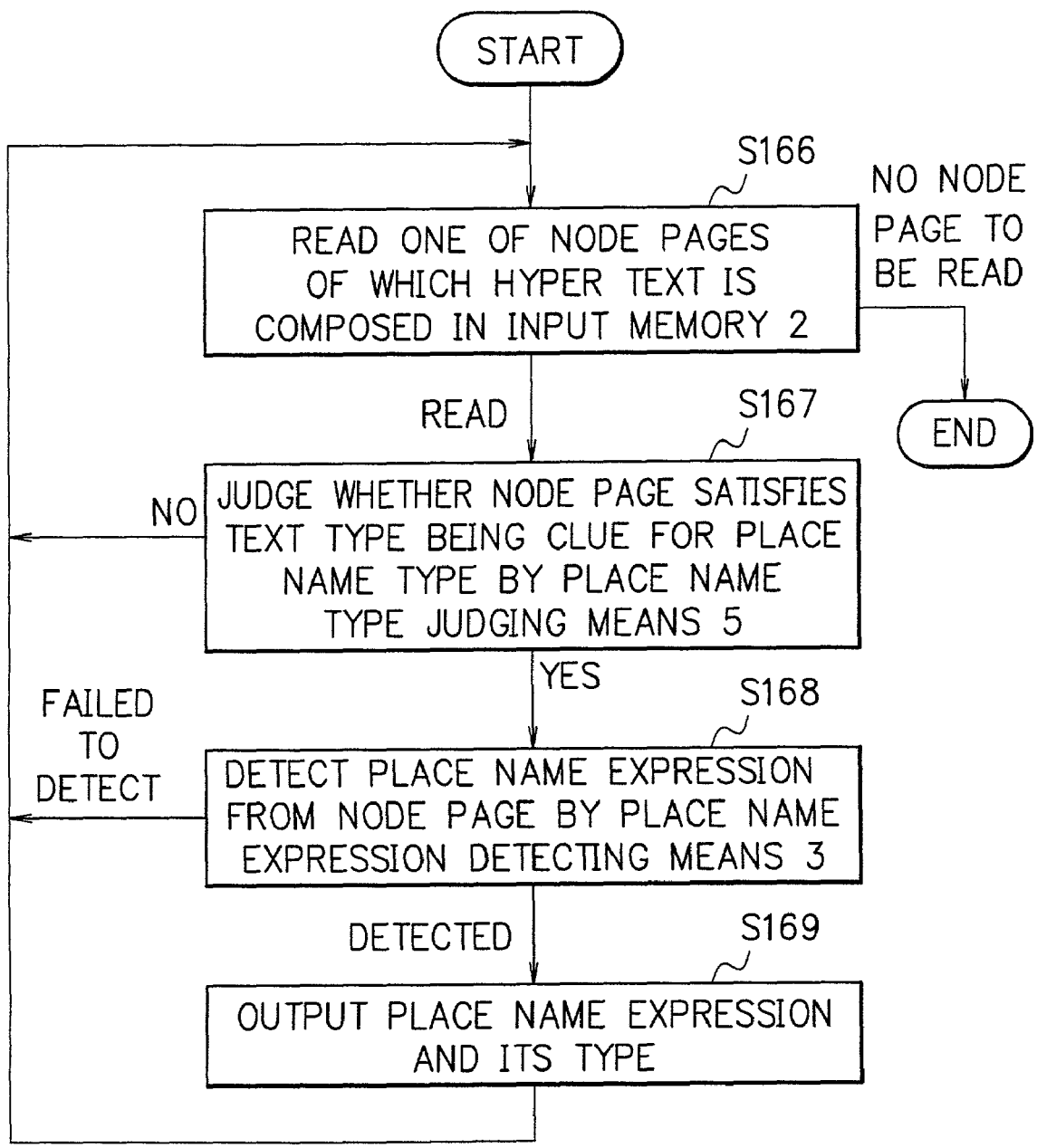
FIG. 21 is a flowchart showing a total operation at the other alternative at the second embodiment of the place name information extraction apparatus of the present invention.

Next, referring to FIGS. 2 and 21, the other alternative operation at the second embodiment of the place name information extraction apparatus of the present invention is explained. First, one of node pages of which a hypertext is composed is read in the input memory 2 (step S166). The place name type judging means 5 judges whether the text type of the node page in the input memory 2 satisfies a text type being a clue for its place name type or not (step S167). When the text type is the text type being the clue of the place name type, the place name expression detecting means 3 detects the place name expression from the node page (step S168). And the place name expression and its place name type are written in the work memory 4 (step S169).

Referring to FIGS. 2, 11, 14, and 21, the other alternative operation at the second embodiment of the place name information extraction apparatus of the present invention is explained in detail. First, at the step S166, the node page 31 in FIG. 11 is read in the input memory 2. At the step S167, the text type of the node page 31 is judged to be "Event Information Page". With this judged result, the place name type is judged to be "Event Site" by the text type and place name type corresponding table shown in FIG. 14. At the step S168, "N corporation Building, Minato Ward, Tokyo" is detected from the node page 31 as the place name expression. At the step S169, the place name expression "N corporation Building, Minato Ward, Tokyo", the appeared position "Node page 31, 49th letter to 85th letter", and the place name type "Event Site" are written in the work memory 4.

Figure 22:
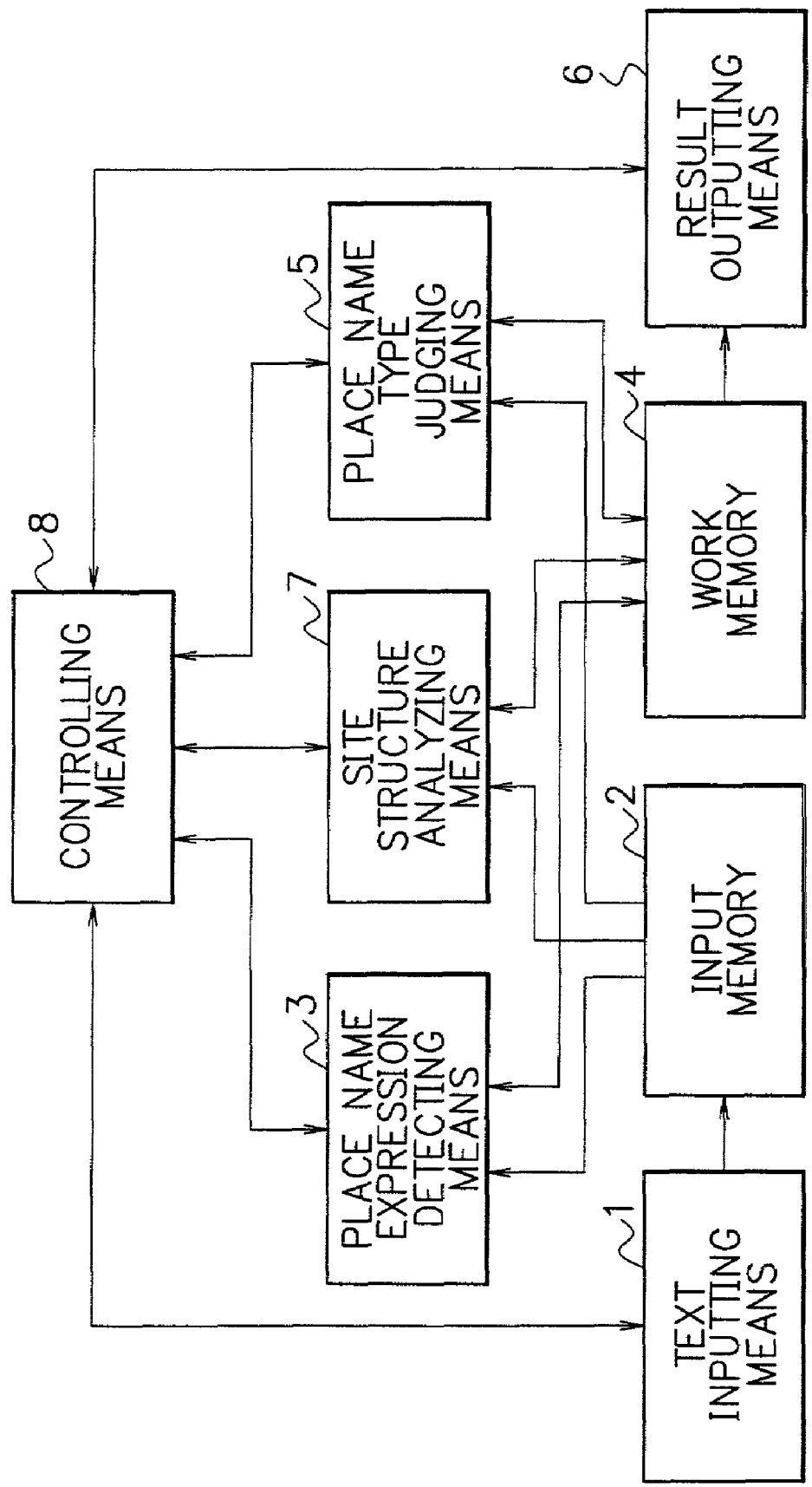
FIG. 22 is a block diagram showing a structure at a third embodiment of the place name information extraction apparatus of the present invention.

Next, referring to the drawings, a third embodiment of the place name information extraction apparatus of the present invention is explained. FIG. 22 is a block diagram showing a structure at the third embodiment of the place name information extraction apparatus of the present invention. As shown in FIG. 22, the third embodiment of the place name information extraction apparatus of the present invention consists of a text inputting means 1, an input memory 2, a place name expression detecting means 3, a work memory 4, a place name type judging means 5, a result outputting means 6, a site structure analyzing means 7, and a controlling means 8.

The text inputting means 1 reads a text of node pages of which a hypertext is composed in the input memory 2. The input memory 2 stores the text read by the text inputting means 1. The place name expression detecting means 3 detects a place name expression from the text storing in the input memory 2, and write the detected place name expression and the information of its appeared position in the work memory 4.

The site structure analyzing means 7 analyzes whether a group of node pages neighboring and including the node page, in which the place name expression was detected, satisfies a specific hypertext structure or not, by referring to the contents in the input memory 2 and the work memory 4, and writes the analyzed result in the work memory 4.

The place name type judging means 5 judges a place name type of the place name expression which is included in the group of node pages satisfying the specific hypertext structure by referring to the contents in the input memory 2 and the work memory 4, and writes the judged result being the place name type in the work memory 4.

The work memory 4 stores the place name expression and the information of its appeared position detected by the place name expression detecting means 3, the analyzed result at the site structure analyzing section 7, and the information of the place name type of the place name expression judged at the place name type judging means 5.

The result outputting means 6 reads the contents in the work memory 4 and outputs the read result. The controlling means 8 controls a series of operation of the means and memories in the place name information extraction apparatus.

Each of these means can be realized by using a computer that is operated by program control. As the input memory 2 and the work memory 4, the main memory of the computer can be used, but an external storage such as a magnetic disk and a magneto-optical disk can be also used.

The place name expression detecting means 3 corresponds to the conventional place name information extraction apparatus, and can be realized by the existing technology mentioned above. At the third embodiment of the place name information extraction apparatus of the present invention, the place name type judging means 5 and the site structure analyzing means 7 are provided, and these are different from the conventional place name information extraction apparatus.

Figure 23:
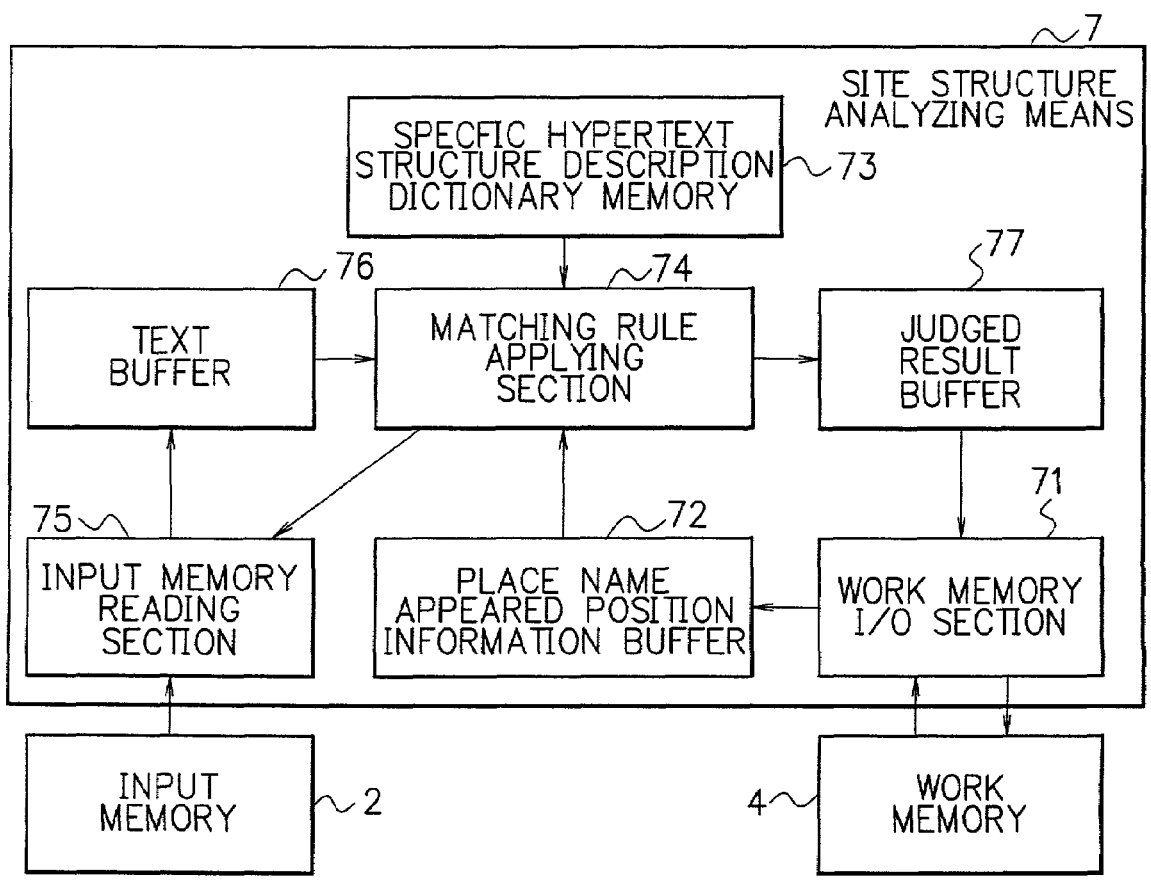
FIG. 23 is a block diagram showing a structure of a site structure analyzing means at the third embodiment of the place name information extraction apparatus of the present invention.

FIG. 23 is a block diagram showing a structure of the site structure analyzing means 7 at the third embodiment of the place name information extraction apparatus of the present invention. Referring to FIG. 23, the structure of the site structure analyzing means 7 is explained in detail.

As shown in FIG. 23, the site structure analyzing means 7 consists of a work memory I/O section 71, a place name appeared position information buffer 72, a specific hypertext structure description dictionary memory 73, a matching rule applying section 74, an input memory reading section 75, a text buffer 76, and a judged result buffer 77.

The work memory I/O section 71 reads the place name expression and the information of its appeared position storing in the work memory 4 detected by the place name expression detecting means 3, and transfers the read result to the place name appeared position information buffer 72.

The place name expression and the information of its appeared position read from the work memory I/O section 71 are read in the place name appeared position information buffer 72.

FIG. 24 is a diagram showing the contents of a specific hypertext structure description dictionary at the third embodiment of the place name information extraction apparatus of the present invention. As shown in FIG. 24, the specific hypertext structure description dictionary consists of a rule number 34, a matching rule 35, and a place name type deciding rule 36. And this specific hypertext structure description dictionary is stored in the specific hypertext structure description dictionary memory 73. The matching rule 35 detects whether a text satisfies a specific hypertext structure or not, and the place name type deciding rule 36 decides a place name type of the place name expression appeared in the text satisfying the specific hypertext structure that was matched with the matching rule 35. And the matching rule 35 and the place name type deciding rule 36 are stored corresponding to the rule number 34. In this, the specific hypertext structure description dictionary shown in FIG. 24 has only three structures, however, actually, the specific hypertext structure description dictionary has more than three structures.

The matching rule applying section 74 takes out the matching rule 35 one by one from the specific hypertext structure description dictionary memory 73, and calculates a group of node pages to which the matching rule 35 is applied, based on the appeared position of the place name expression from the place name appeared position information buffer 72, and instructs the input memory reading section 75 to read the reading range of the calculated group of node pages. The input memory reading section 75 reads the group of node pages by this instruction, and stores the read result in the text buffer 76. And the matching rule applying section 74 detects whether the group of node pages are matched with the matching rule 35 read from the specific hypertext structure description dictionary memory 73 by referring to the group of node pages storing in the text buffer 76. The result applied the matching rule 35 at the matching rule applying section 74 is stored in the judged result buffer 77. After all the matching rules 35 were applied to the group of node pages, the judged result is stored in the work memory 4 via the work memory I/O section 71. That is, the information of what group of node pages satisfied what specific hypertext structure is written in the work memory 4 by the analysis of the site structure analyzing means 7. In this, the groups of node pages are shown by the list of the respective identification numbers of the node pages, and each of the specific hypertext structures is shown by each of the rule number 34 shown in FIG. 24.

Figure 25:
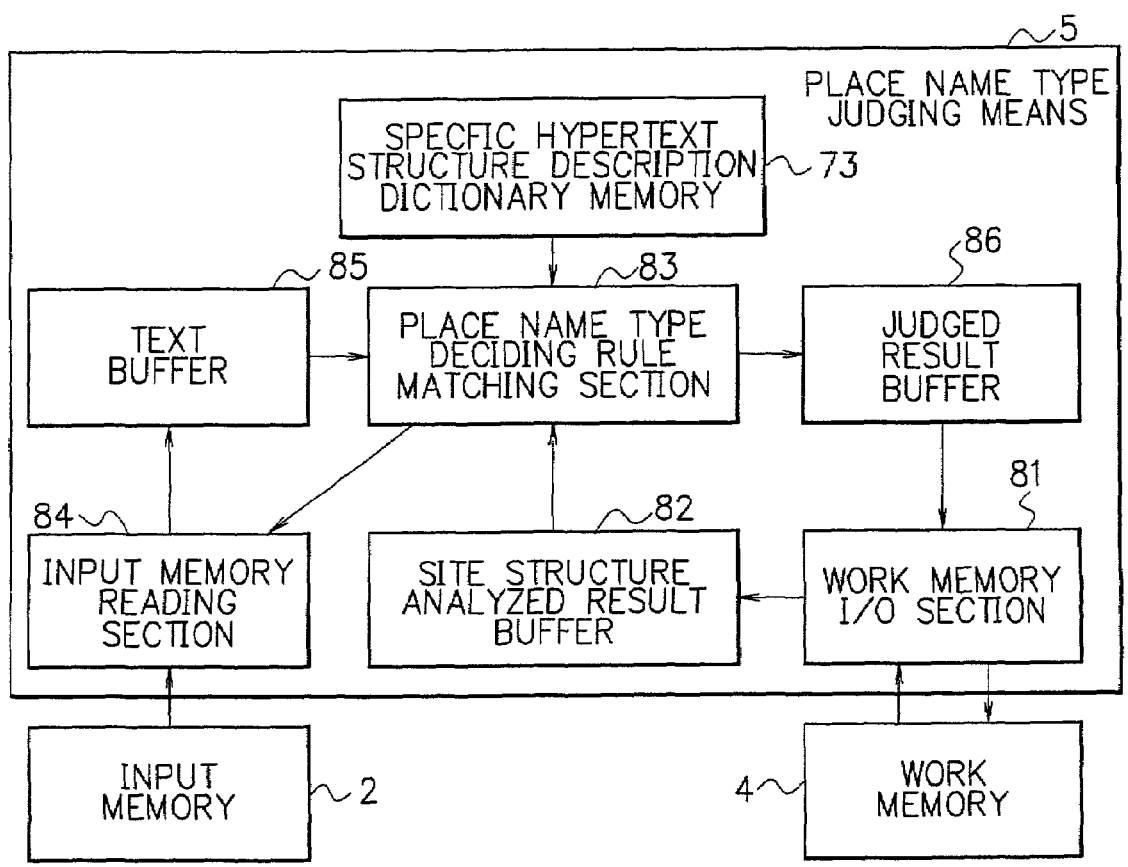
FIG. 25 is a block diagram showing a structure of a place name type judging means at the third embodiment of the place name information extraction apparatus of the present invention.

FIG. 25 is a block diagram showing a structure of the place name type judging means 5 at the third embodiment of the place name information extraction apparatus of the present invention. As shown in FIG. 25, the place name type judging means 5 at the third embodiment of the place name information extraction apparatus of the present invention consists of a work memory I/O section 81, a site structure analyzed result buffer 82, a specific hypertext structure description dictionary memory 73, a place name type deciding rule matching section 83, an input memory reading section 84, a text buffer 85, and a judged result buffer 86.

The work memory I/O section 81 takes out the analyzed result by the site structure analyzing means 7 and stores the taken out analyzed result in the site structure analyzed result buffer 82.

As mentioned above, the specific hypertext structure description dictionary is stored in the specific hypertext structure description dictionary memory 73. The matching rule 35 detects whether a text satisfies a specific hypertext structure or not, and the place name type deciding rule 36 decides a place name type of the place name expression appeared in the text satisfying the specific hypertext structure that was matched with the matching rule 35. And the matching rule 35 and the place name type deciding rule 36 are stored corresponding to the rule number 34.

The place name type deciding rule matching section 83 refers to the rule number 34 of the matching rule 35 corresponding to the group of node pages to be processed, storing in the site structure analyzed result buffer 82. And the place name type deciding rule matching section 83 transfers the information to designate the group of node pages for applying the place name type deciding rule 36 storing in the specific hypertext structure description dictionary memory 73 corresponding to the rule number 34 to the input memory reading section 84. Next, the input memory reading section 84 reads the group of node pages from the input memory 2 by this designation, and stores the read group of node pages in the text buffer 85. And the place name type deciding rule matching section 83 applies the place name type deciding rule 36 to the group of node pages, and judges the place name type. And the judged result is stored in the judged result buffer 86. After the place name type deciding rule 36 corresponding to the matching rule 35 was applied to all the group of node pages judged by the site structure analyzing means 7, the place name type judging means 5 writes the judged result in the work memory 4 via the work memory I/O section 81. That is, the place name type is written in the work memory 4 corresponding to the appeared position of the place name expression by the place name type judging means 5.

At the third embodiment of the present invention, the specific structure having by a hypertext is focused on, and when a node page to be processed is included in a group of node pages having a predetermined specific structure, a place name type appeared in this node page is judged by a predetermined specific rule, and the place name type is judged with high accuracy.

The matching rule 35 which judges whether a group of node pages satisfies a predetermined specific structure or not, and the place name type deciding rule 36 which decides a place name type appeared in the group of node pages corresponding to this matching rule 35 are shown in FIG. 24. In the specific hypertext structure description dictionary memory 73 in the site structure analyzing means 7 and the place name type judging means 5, the matching rule 35 and the place name type deciding rule 36 are stored in a state that they are corresponding to each other.

Next, a place name type deciding method at a hypertext structure satisfying the matching rule 35 in the specific hypertext structure description dictionary shown in FIG. 24 is explained in detail by using a concrete example. FIG. 26 is a diagram showing the contents of a hypertext structure satisfying No. 1 of the rule number 34 shown in FIG. 24 at the third embodiment of the place name information extraction apparatus of the present invention.

Referring to FIGS. 23, 24, 25, and 26, it is explained that the hypertext structure shown in FIG. 26 satisfies the matching rule 35 at the No. 1 of the rule number 34 in FIG. 24. As shown in FIG. 26, there are three node pages, and a node page 37 corresponds to X, a node page 38 corresponds to Y, and a node page 39 corresponds to Z in FIG. 24, this is a first condition at the matching rule 35. As a second condition of the matching rule 35, "Kanto District" of a link source key character string 41 in the node page 38 in FIG. 26 is a place name expression A. And as a third condition of the matching rule 35, "Minato ward, Tokyo", "Fuchu City, Tokyo", "Kawasaki City, Kanagawa Prefecture", "Maebashi City, Gunma Prefecture", and "Nikko, City, Tochigi Prefecture" in the node page 39 in FIG. 26 are place name expressions Bi. As a fourth condition of the matching rule 35, "Minato ward, Tokyo", "Fuchu City, Tokyo", "Kawasaki City, Kanagawa Prefecture", "Maebashi City, Gunma Prefecture", and "Nikko, City, Tochigi Prefecture" are positioned below "Kanto district" at the place name class relation.

Under these conditions, the site structure analyzing means 7 analyzes that the node pages 37, 38, and 39 in FIG. 26 satisfy the matching rule 35 of the No. 1 of the rule number 34 in FIG. 24. Next, the place name type judging means 5 applies the place name type deciding rule 36 to this group of node pages. At the place name type deciding rule 36 corresponding to the No. 1 of the rule number 34 in FIG. 24, the place name type judging means 5 retrieves a clue expression of the place name type from character strings before and after a link source key character string 40 "Guide of branch offices" in the node page 37 in FIG. 26 or the place name expression A "Kanto district" in the node page 38. As the retrieved result, "branch offices" in the "Guide of branch offices" 40 becomes the clue expression, and the place name type is decided as "location". That is, it is judged that the place name expressions "Minato ward, Tokyo", "Fuchu City, Tokyo", "Kawasaki City, Kanagawa Prefecture", "Maebashi City, Gunma Prefecture", and "Nikko City, Tochigi Prefecture" have the place name type "location".

Figure 27:
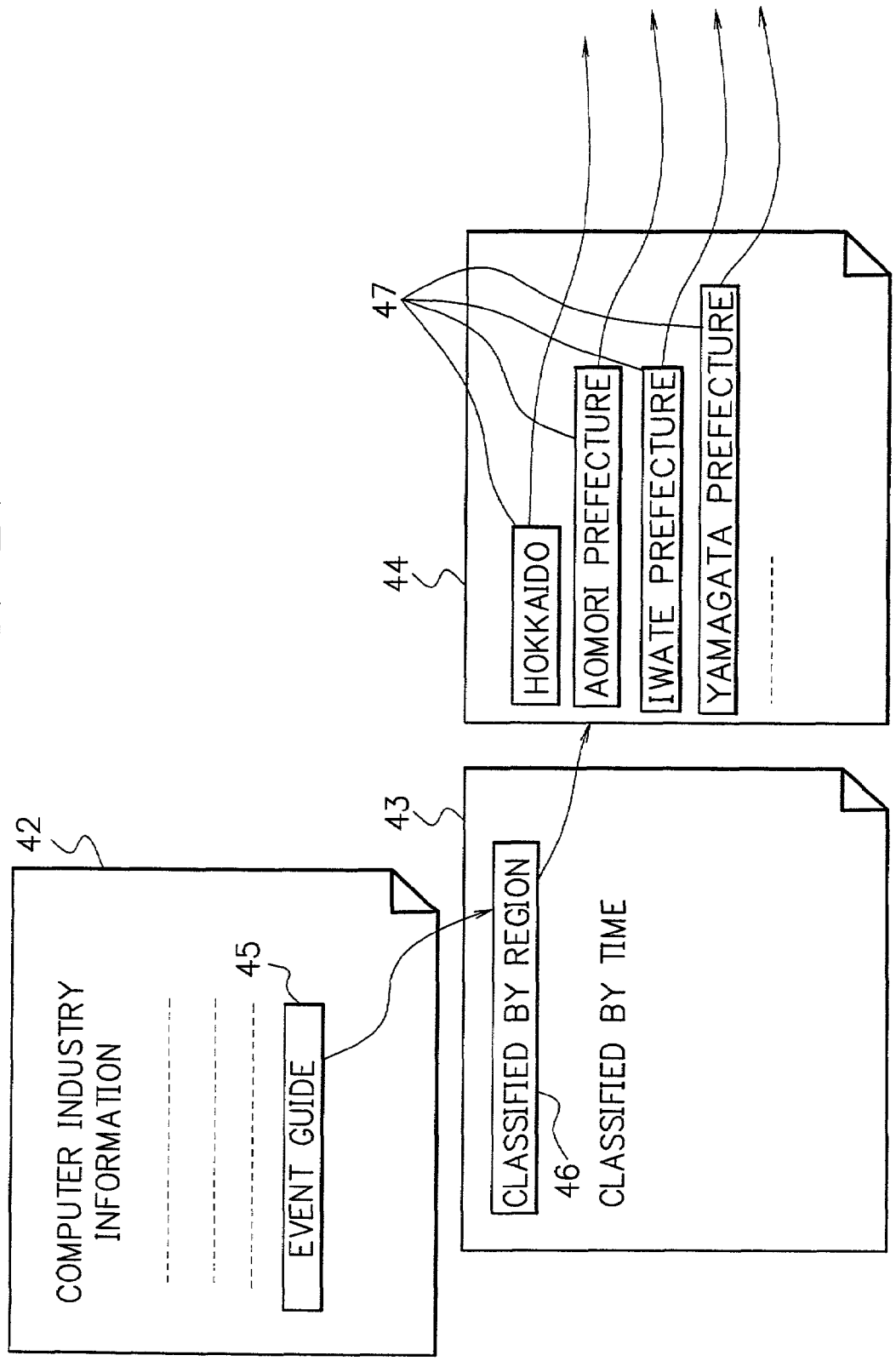
FIG. 27 is a diagram showing the contents of a hypertext structure satisfying No. 2 of the rule number 34 shown in FIG. 24.

FIG. 27 is a diagram showing the contents of a hypertext structure satisfying No. 2 of the rule number 34 shown in FIG. 24 at the third embodiment of the place name information extraction apparatus of the present invention.

Referring to FIGS. 23, 24, 25, and 27, it is explained that the hypertext structure shown in FIG. 27 satisfies the matching rule 35 at the No. 2 of the rule number 34 in FIG. 24. As shown in FIG. 27, a node page 43 corresponds to X, and a node page 44 corresponds to Y in FIG. 24, this is a first condition at the matching rule 35 at the No. 2 of the rule number 34. As a second condition of the matching rule 35, "Hokkaido", "Aomori Prefecture", "Iwate Prefecture", and "Yamagata Prefecture" correspond to place name expressions Bi, corresponding to that plural link source key character strings 47 including the place name expression exist in the node page 44 in FIG. 27. And these place name expressions Bi are all prefecture level place name expressions, therefore these place name expressions have brother/sister relation at the place name class relation, this is a third condition of the matching rule 35.

Under these conditions, the site structure analyzing means 7 analyzes that the node pages 43 and 44 in FIG. 27 satisfy the matching rule 35 of the No. 2 of the rule number 34 in FIG. 24. Next, the place name type judging means 5 applies the place name type deciding rule 36 to this group of node pages. At the place name type deciding rule 36 corresponding to the No. 2 of the rule number 34 in FIG. 24, the place name type judging means 5 retrieves a clue expression of the place name type from a link source key character string 46 "Classified by region" in the node page 43 in FIG. 27, however, the clue expression could not be retrieved. Next, the place name type judging means 5 retrieves a clue expression of the place name type from a link source key character string 45 "Event Guide" in the link source page 42 being upper to the node page 43. With this, a clue expression "Event" is retrieved, and the place name type is decided as "Event Site". That is, the place name expressions "Hokkaido", "Aomori Prefecture", "Iwate Prefecture", and "Yamagata Prefecture" are judged to be that these place name expressions have the place name type "Event Site".

Figure 28:
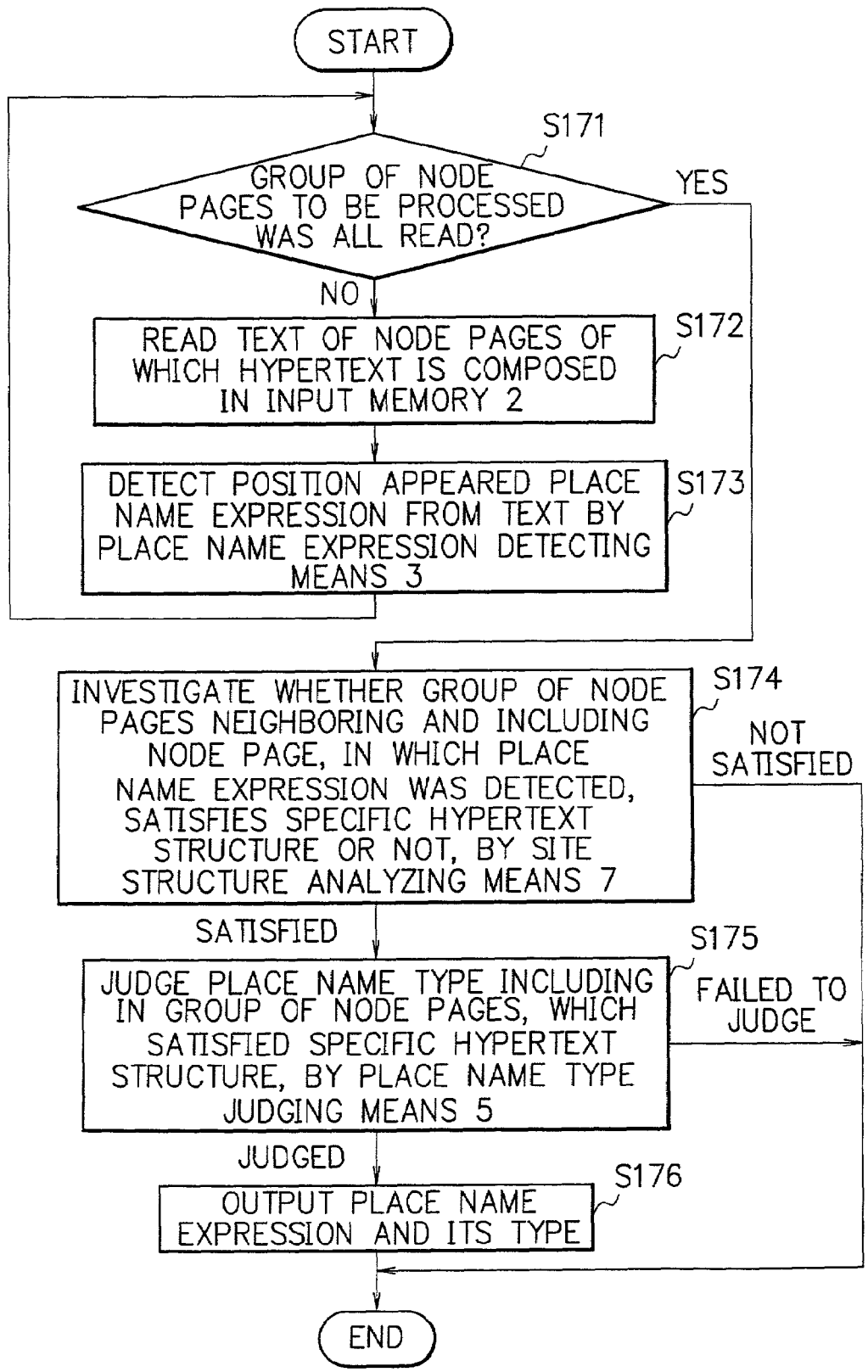
FIG. 28 is a flowchart showing a total operation at the third embodiment of the place name information extraction apparatus of the present invention.

Next, referring to the drawings, a total operation of the third embodiment of the present invention is explained. FIG. 28 is a flowchart showing the total operation at the third embodiment of the place name information extraction apparatus of the present invention.

First, it is judged whether a group of node pages to be processed was all read in the input memory 2 or not (step S171). And when all the group of node pages to be processed has not been read yet in the input memory 2 (No at the step S171), the text inputting means 1 reads a text of node pages of which a hypertext is composed in the input memory 2 (step S172). The place name expression detecting means 3 detects the position appeared the place name expression in the text in the input memory 2 (step S173). That is, the place name expression detecting means 3 writes the detected result, which are the place name expression and its appeared position, that is, the place name expression is appeared at what letter number in what node page, in the work memory 4.

The loop composed of the steps S171, S172, and S173 repeats to read node pages by tracing links in the hypertext, and makes the input memory 2 store the contents of the text and the information of links of the node pages in the hypertext. At the step S171, when the group of node pages to be processed was all read, this loop ends.

There are several methods for judging whether the group of node pages to be processed was all read in the input memory 2 or not. For example, as a first method, reading node pages ends at a node page to which its link is traced by K depths from a starting node page. As a second method, reading node pages ends at a node page whose number from a starting node page reached M. As a third method, reading node pages ends when a large change occurred in the contents of a text by tracing links with judging the contents (key words) of the text of node pages. As a fourth method, reading node pages ends, at the time when a site or directory to which a node page belongs, being possible to be judged by a URL character string, changes largely. These ending conditions are used at the WWW page automatically collecting tools such as the Auto Pilot and the WWW Robot.

Next, the site structure analyzing means 7 investigates whether a group of node pages neighboring and including the node page in which the place name expression was detected satisfies a specific hypertext structure or not (step S174). FIG. 29 is a flowchart showing processes at the step S174 of FIG. 28 in detail. At the specific hyper text structure description dictionary shown in FIG. 24, one rule consists of a combination of the rule number 34, the matching rule 35, and the place name type deciding rule 36.

At the flowchart shown in FIG. 29, first, the rule number R being the value of a counter is set to be "1" (step S181), and the loop from step S182 to step S186 investigates the matching rule 35 in the specific hypertext structure description dictionary one by one, by making the rule number R be increment one by one. The matching rule 35 of the Rth specific hypertext structure is taken out from the specific hypertext structure description dictionary shown in FIG. 24 (the step S182). Next, a subset composed of node pages in the input memory 2 corresponding to the matching rule 35 is investigated by referring to the information of links of the group of node pages in the input memory 2 and the information of the position appeared the place name expression in the work memory 4 (step S183). When the node pages (subset) satisfying the matching rule 35 were searched, the rule number R and an identification number list of the group of node pages corresponding to the subset satisfied the matching rule 35 is written in the work memory 4 (step S184). And as mentioned above, the rule number R is increased by "1" (step S185), and when it is judged that the rule number R is the last rule number (YES at the step S186), the operation ends. As the result of the operation at the step S174, the list of the subset (node pages) corresponding to the matching rules 35 are stored in the work memory 4.

When the group of node pages satisfied a specific hypertext structure at the step S174, the place name type judging means 5 judges the place name type of the place name expression including in the group of node pages satisfied the specific hypertext structure (step S175).

Figure 30:
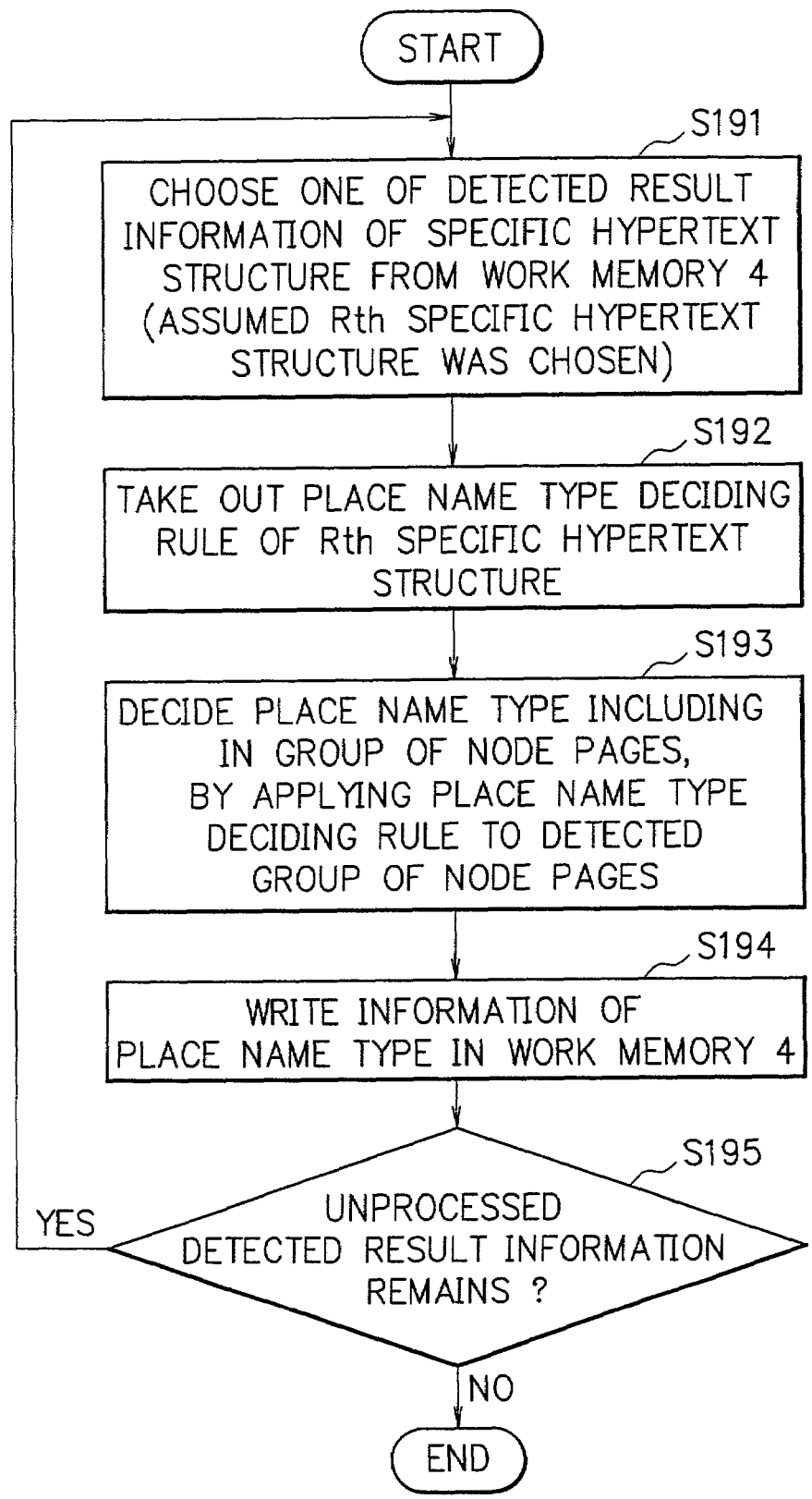
FIG. 30 is a flowchart showing processes at the step S175 of FIG. 28 in detail.

FIG. 30 is a flowchart showing processes at the step S175 of FIG. 28 in detail. At the loop from step S191 to step S195 in FIG. 30, the detected result information of the specific hyper text structures storing in the work memory 4 is taken out one by one, and the taken out information is processed. In the detected result information, the rule numbers corresponding to the detected specific hypertext structures are described. First, one of the detected result information of the specific hypertext structures is chosen from the work memory 4, in this, it is assumed that the Rth specific hypertext structure was chosen (the step S191). The place name type deciding rule 36 corresponding to the Rth specific hypertext structure is read from the specific hypertext structure description dictionary shown in FIG. 24 (step S192). Next, the place name type deciding rule 36 is applied to the detected group of node pages, and the place name type of the place name expression including in the detected group of node pages is decided (step S193). The identification number list of the detected group of node pages can be obtained from the work memory 4, and the group of node pages corresponding to the list is stored in the input memory 2. The place name expression appeared in the detected group of node pages is stored in the work memory 4. A pattern matching process (applying matching rule) is applied by referring to this information, as a result, the information of the place name type of the place name expression is written in work memory 4 (step S194). When the unprocessed detected result information does not remain, the operation of the place name type judging means 5 ends (the step S195).

And the information of the place name expressions and corresponding their place name types of all the detected specific hypertext structures is written in the work memory 4 (step S176).

As mentioned above, at the third embodiment of the place name information extraction apparatus of the present invention, when a group of node pages to be processed satisfies a predetermined specific structure, the place name type of a place name expression appeared in the node pages is judged by applying a specific rule to this specific structure. With this, the place name type of the place name expression can be judged with higher accuracy.

Next, referring to the drawings, embodiments of a map information retrieval apparatus used the place name information extraction apparatus of the present invention is explained.

Figure 31:
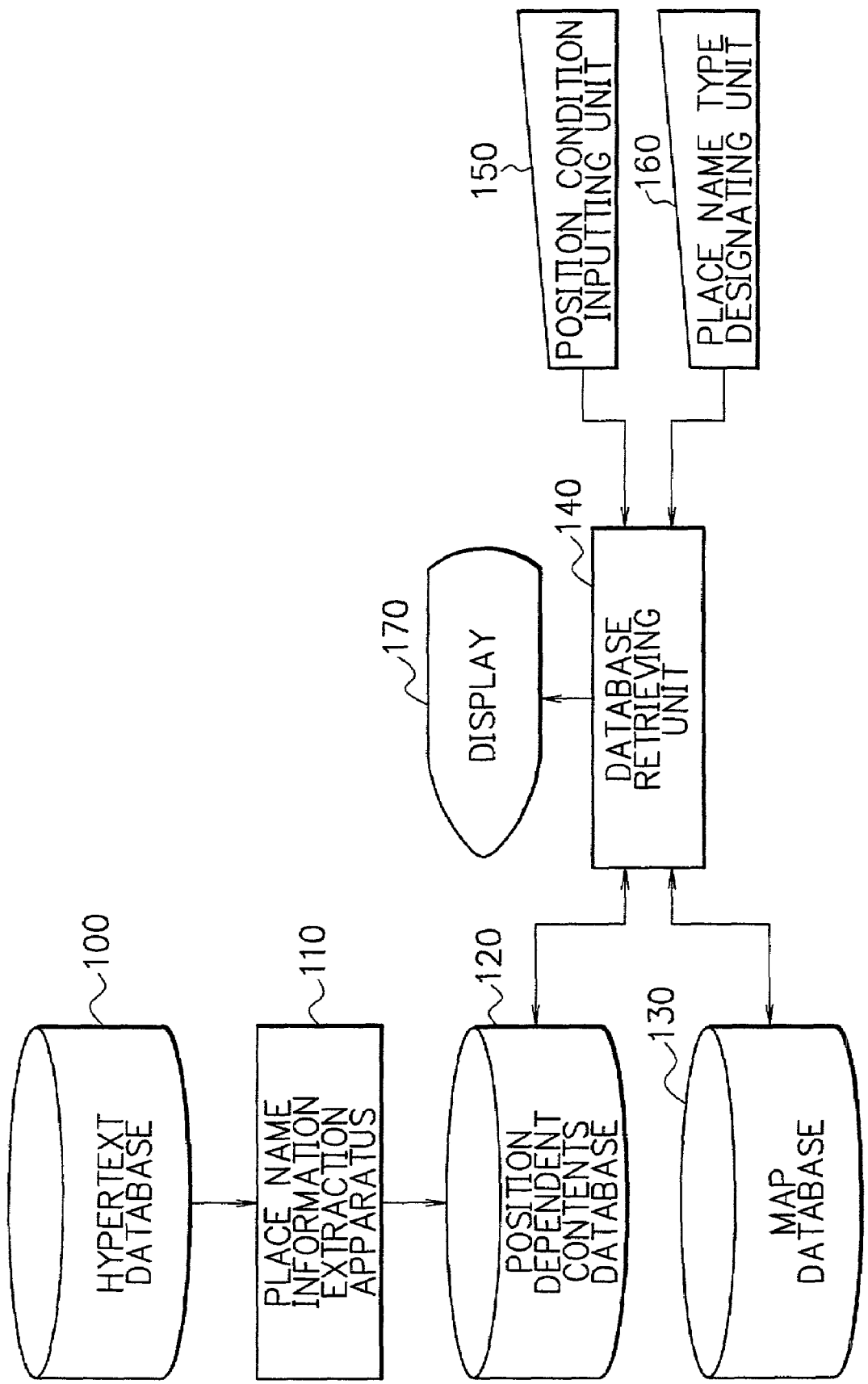
FIG. 31 is a block diagram showing a first embodiment of a map information retrieval apparatus used the place name information extraction apparatus of the present invention.

FIG. 31 is a block diagram showing a first embodiment of the map information retrieval apparatus used the place name information extraction apparatus of the present invention. The first embodiment of the map information retrieval apparatus used the place name information extraction apparatus of the present invention consists of a hypertext database 100, a place name information extraction apparatus 110, a position dependent contents database 120, a map database 130, a database retrieving unit 140, a position condition inputting unit 150, a place name type designating unit 160, and a display 170.

Hypertexts are stored in the hypertext database 100. For example, WWW servers on the Internet correspond to this hypertext database 100. The place name information extraction apparatus 110 extracts the information concerning place name expressions and their place name types from texts in the hypertext database 100. This place name information extraction apparatus 100 corresponds to the apparatus explained at the second and third embodiments of the place name information extraction apparatus of the present invention shown in FIGS. 2 and 22. The position dependent contents database 120 stores the information extracted by the place name information extraction apparatus 110.

FIG. 32 is a diagram showing data contents of the position dependent contents database 120 in FIG. 31. As shown in FIG. 32, the position dependent contents database 120 consists of a place name expression column 181, a place name type column 182, and a node page number column 183, and data in these columns are stored corresponding to one another. For example, "Minato Ward, Tokyo" in the place name expression column 181 corresponds to the node page 31 in the node page number column 183 at "Event Site" in the place name type column 182, and also corresponds to the node page 39 in the node page number column 183 at "Location" in the place name type column 182.

The map database 130 stores two-dimensional coordinate data of maps and place name expressions mapping on the coordinate data. The position condition inputting unit 150 is a unit to which a user inputs a place name expression such as "Minato Ward, Tokyo". And as this position condition inputting unit 150, a character string inputting means such as a keyboard, a pointing device such as a mouse, and a system such as the global positioning system (GPS) that automatically obtains a present position of a car or a person, are used. The place name designating unit 160 is a unit by which a user designates a place name type such as "Location", "Event Site", "Passing Point", and "Topic Spot". The database retrieving unit 140 retrieves the map database 130 and the position dependent contents database 120, under the conditions designated by the position condition inputting unit 150 and the place name type designating unit 160, and displays the retrieved result on the display 170.

The database retrieving unit 140 retrieves the map database 130 by that a place name expression designated by the position condition inputting unit 150 is made to be a key, and reads map data neighboring and including the place name expression. At the same time, the database retrieving unit 140 retrieves the position dependent contents database 120 by that the place name expression designated by the position condition inputting unit 150 and a place name type designated by the place name type designating unit 160 are made to be keys. And the database retrieving unit 140 adds the two retrieved results and displays the added two retrieved results on the display 170.

Figure 33:
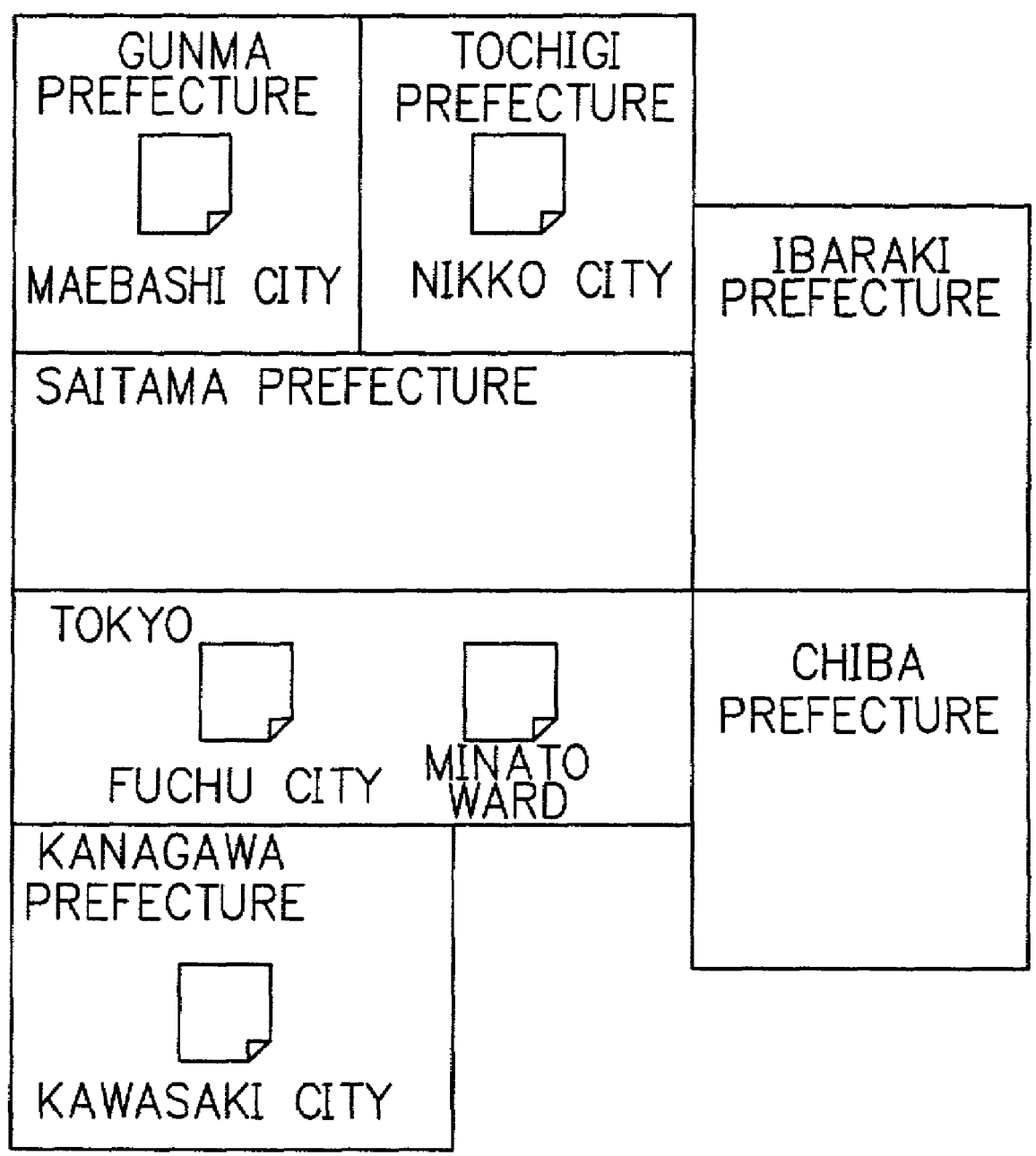
FIG. 33 is a diagram showing a first displaying example on a display at the first embodiment of the map information retrieval apparatus used the place name information extraction apparatus of the present invention.

FIG. 33 is a diagram showing a first displaying example on the display 170 at the first embodiment of the map information retrieval apparatus used the place name information extraction apparatus of the present invention. In FIG. 33, "Location" was designated by the place name type designating unit 160 as its place name type, and the position dependent contents database 120 shown in FIG. 32 and the map database 130 are used, as the retrieved result, the place name expressions are displayed on the map. That is, five place name expressions were displayed on the map by the place name type "Location".

Figure 34:
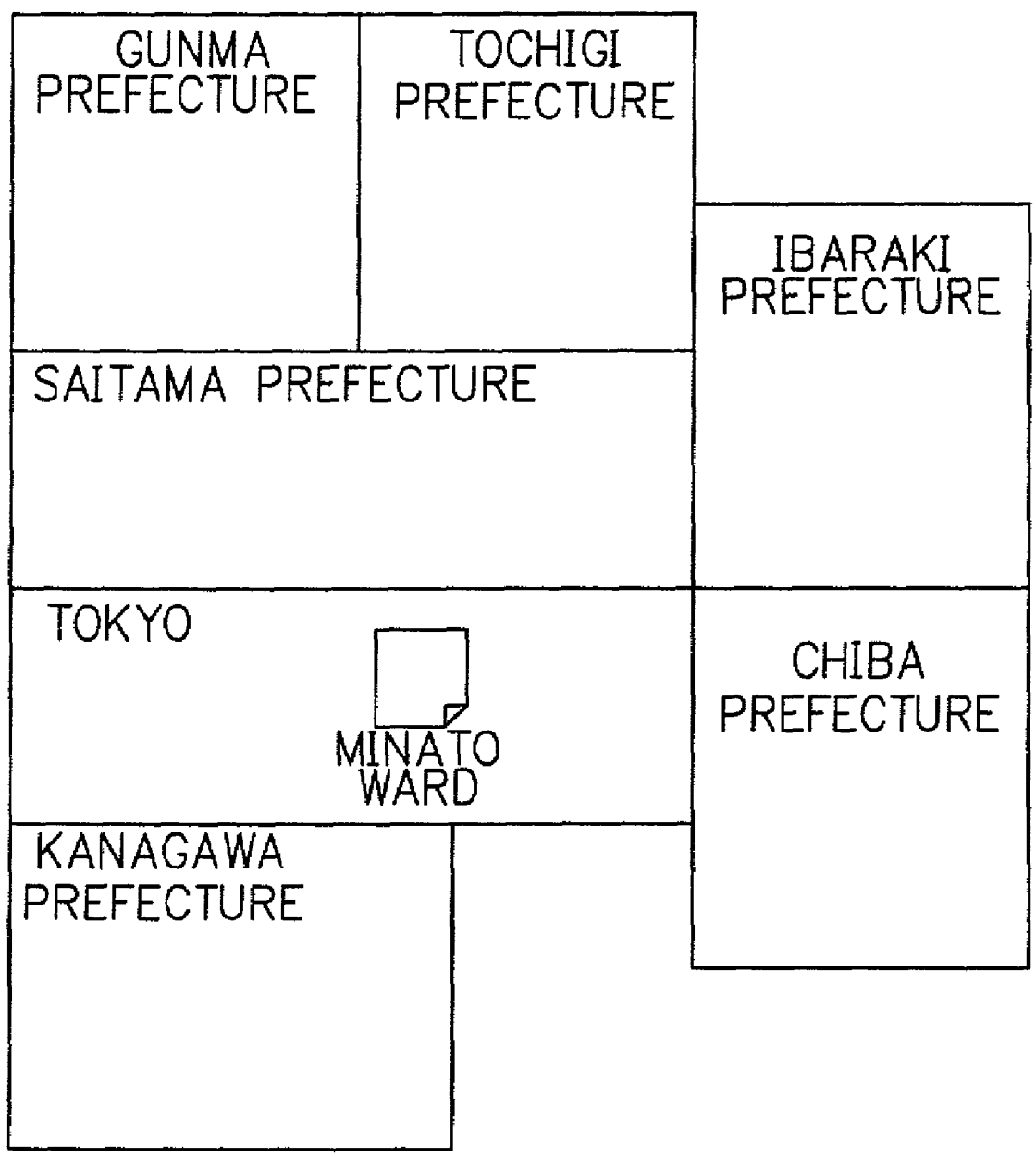
FIG. 34 is a diagram showing a second displaying example on the display at the first embodiment of the map information retrieval apparatus used the place name information extraction apparatus of the present invention.

FIG. 34 is a diagram showing a second displaying example on the display 170 at the first embodiment of the map information retrieval apparatus used the place name information extraction apparatus of the present invention. In FIG. 34, "Event Site" was designated by the place name type designating unit 160 as its place name type, and the position dependent contents database 120 shown in FIG. 32 and the map database 130 are used, as the retrieved result, the place name expression is displayed on the map. That is, one place name expression was displayed on the map by the place name type "Event Site"

As mentioned above, the amount of information (amount of node pages), which is displayed by adding its map data, can be controlled corresponding to the object of the user, by that the information of place name types is provided and the user designates the place name type.

Next, referring to the drawing, a second embodiment of the map information retrieval apparatus used the place name information extraction apparatus of the present invention is explained.

FIG. 35 is a block diagram showing the second embodiment of the map information retrieval apparatus used the place name information extraction apparatus of the present invention. The second embodiment of the map information retrieval apparatus used the place name information extraction apparatus of the present invention consists of an input unit 200, a data processor 210, storage 220, an output unit 240, and further a storing medium 230 in which programs to realize the second and third embodiments of the place name information extraction apparatus are stored. This storing medium 230 can be realized by a magnetic disk, a semiconductor memory, a CD-ROM, or another storing medium.

The input unit 200 is a unit, to which a user inputs his/her instructions, and can be realized by a mouse or a keyboard. The output unit 240 is a unit, from which processed results by the data processor 210 are outputted, and can be realized by a display or a printer.

The programs to realize the place name information extraction apparatus are read in the data processor 210 from the storing medium 230, and controls the operation of the data processor 210, and makes the input memory 2 and the work memory 4 work in the storage 220. The data processor 210 executes the same processes at the text inputting means 1, the place name expression detecting means 3, the place name type judging means 5, the result outputting means 6, and controlling means 8 at the first, second, and third embodiments, and the site structure analyzing means 7 at the third embodiments of the place name information extraction apparatus, by the program control to realize the place name information extraction apparatus.

In this, texts or hypertext databases to be processed are read in the storage 220, or the data processor 210 obtains the texts or the hypertext databases from external databases by accessing to the external databases via a network such as the Internet.

Next, referring to the drawing, a third embodiment of the map information retrieval apparatus used the place name information extraction apparatus of the present invention is explained.

Figure 36:
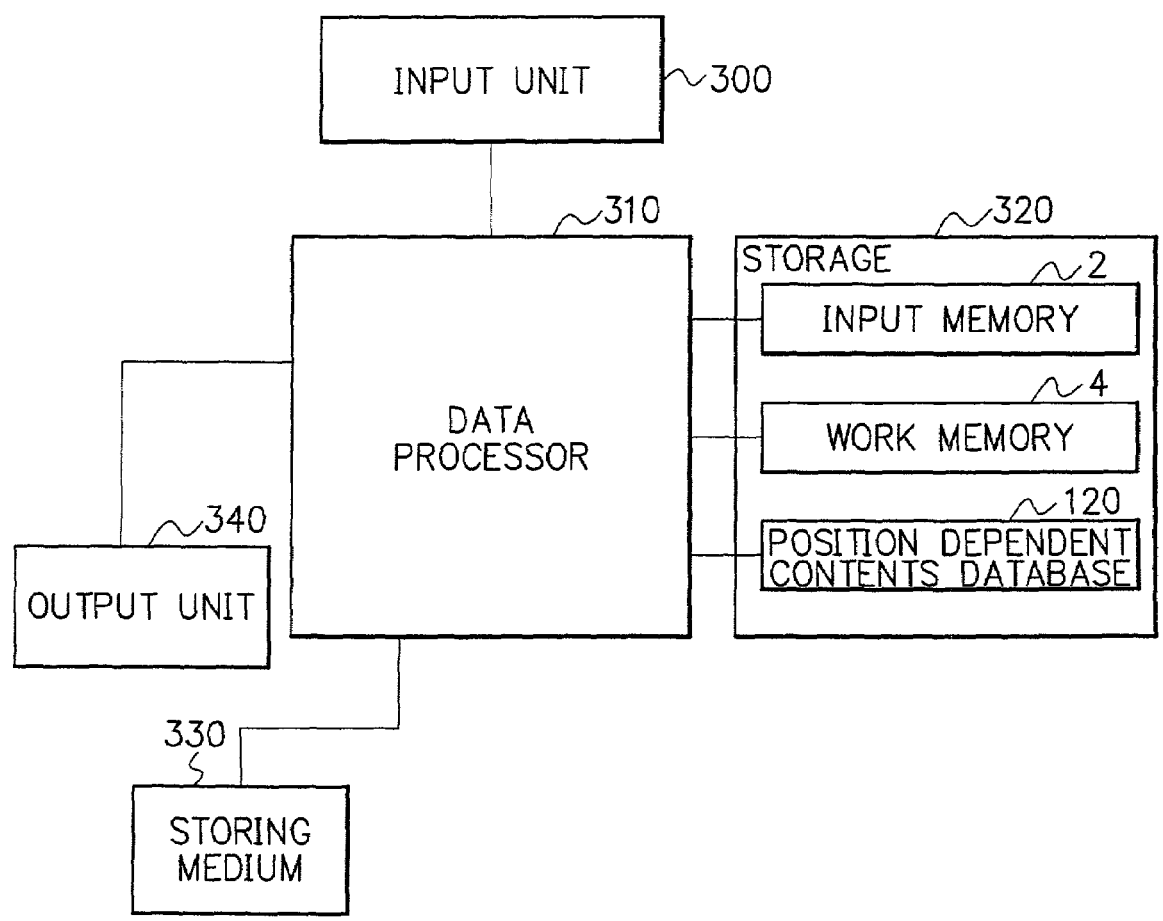
FIG. 36 is a block diagram showing a third embodiment of the map information retrieval apparatus used the place name information extraction apparatus of the present invention.

FIG. 36 is a block diagram showing the third embodiment of the map information retrieval apparatus used the place name information extraction apparatus of the present invention. The third embodiment of the map information retrieval apparatus used the place name information extraction apparatus of the present invention consists of an input unit 300, a data processor 310, storage 320, an output unit 340, and further a storing medium 330 in which programs to realize the first embodiment of the map information retrieval apparatus are stored. This storing medium 330 can be realized by a magnetic disk, a semiconductor memory, a CD-ROM, or another storing medium.

As the same as the second embodiment of the map information retrieval apparatus, at this third embodiment, the input unit 300 is a unit, to which a user inputs his/her instructions, and can be realized by a mouse or a keyboard. The output unit 340 is a unit, from which processed results by the data processor 310 are outputted, and can be realized by a display or a printer.

The programs to realize the map information retrieval apparatus are read in the data processor 310 from the storing medium 330, and controls the operation of the data processor 310, and makes the input memory 2, the work memory 4, and the position dependent contents database 120 in the storage 320 work. The data processor 310 executes the same processes at the place name information extraction apparatus 110, the database retrieving unit 140, the position condition inputting unit 150, and the place name type designating unit 160 at the first embodiment of the map information retrieval apparatus, by the program control to realize the map information retrieval apparatus.

In this, the hypertext database 100 to be processed and the map database 130 at the first embodiment of the map information retrieval apparatus are read in the storage 320, or the data processor 310 obtains the hypertext database 100 and the map database 130 from external databases by accessing to the external databases via a network such as the Internet.

According to the present invention, when place name information is extracted from a text automatically, not only a place name expression is extracted, but also the place name type of the detected place name expression can be judged. Furthermore, the place name expression and its place name type can be extracted from a hypertext database such as in the WWW with high accuracy.

Moreover, according to the present invention, when the extracted place name information is offered to a user by corresponding to its map database, the information, which meets the object of the user, can be offered to the user by limiting the amount of information by that the place name type is designated by the user.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A computer implemented place name information extraction apparatus including computer readable media storing programming code for performing processing comprising:

judging a place name type among a plurality of place name types that corresponds to a place name expression appearing in a document by detecting a clue expression in one or both of (i) a link source page, which is a page that links to the document and (ii) a link destination page, which is a page that is linked to from the document, said clue expression being different from said place name expression and serving to permit judgment of which of said plurality of place name types corresponds to said place name expression; and storing the place name type in a memory;

wherein said clue expression is defined by a link itself or text within said one or both of the link source page and the link destination page.

2. A computer implemented place name information extraction apparatus including computer readable media storing programming code for performing processing comprising:

judging a first place name type among a plurality of place name types that corresponds to a place name expression appearing in a document by detecting a clue expression in one or both of (i) a link source page, which is a page that links to the document and (ii) a link destination page, which is a page that is linked to from the document, said clue expression being different from said place name expression and serving to permit judgment of which of said plurality of place name types corresponds to said place name expression;

judging a second place name type from among said plurality of place name types that corresponds to said place name expression based on a text type of a text in said document;

judging a final place name type from among said plurality of place name types that corresponds to said place name expression based on said first place name type and said second place name type; and storing the final place name type in a memory;

wherein said clue expression is defined by a link itself or text within said one or both of the link source page and the link destination page.

3. A computer implemented place name information extraction apparatus including computer readable media storing programming code for performing processing comprising:

detecting a place name expression appearing in a document and a position of said place name expression in said document;

judging a place name type among a plurality of place name types that corresponds to said place name expression appearing in said document by detecting a clue expression in one or both of (i) a link source page, which is a page that links to the document and (ii) a link destination page, which is a page that is linked to from the document, said clue expression being different from said place name expression and serving to permit judgment of which of said plurality of place name types corresponds to said place name expression; and storing the place name type in a memory;

wherein said clue expression is defined by a link itself or text within said one or both of the link source page and the link destination page.

4. A computer implemented place name information extraction apparatus including computer readable media storing programming code for performing processing comprising:

detecting a place name expression appearing in a document and a position of said place name expression in said document;

judging a first place name type among a plurality of place name types that corresponds to said place name expression appearing in said document by detecting a clue expression in one or both of (i) a link source page, which is a page that links to the document and (ii) a link destination page, which is a page that is linked to from the document, said clue expression being different from said place name expression and serving to permit judgment of which of said plurality of place name types corresponds to said place name expression;

judging a second place name type from among said plurality of place name types that corresponds to said place name expression based on a text type of a text of said document;

judging a final place name type from among said plurality of place name types that corresponds to said place name expression based on said first place name type and said second place name type; and storing the final place name type in a memory;

wherein said clue expression is defined by a link itself or text within said one or both of the link source page and the link destination page.

5. A computer implemented place name information extraction apparatus including computer readable media storing programming code for performing processing, comprising:

judging a place name type among a plurality of place name types that corresponds to a place name expression appearing in a document by detecting a clue expression in a link source page that links to the document, said clue expression being different from said place name expression and serving to permit judgment of which of said plurality of place name types corresponds to said place name expression; and storing the place name type in a memory.

6. A computer implemented place name information extraction method, comprising the computer processing step of:

judging a place name type among a plurality of place name types that corresponds to a place name expression appearing in a document by detecting a clue expression in one or both of (i) a link source page, which is a page that links to the document and (ii) a link destination page, which is a page that is linked to from the document, said clue expression being different from said place name expression and serving to permit judgment of which of said plurality of place name types corresponds to said place name expression; and storing the place name type in a memory;

wherein said clue expression is defined by a link itself or text within said one or both of the link source page and the link destination page.

7. A computer implemented place name information extraction method, comprising the computer processing steps of:

judging a first place name type among a plurality of place name types that corresponds to a place name expression appearing in a document by detecting a clue expression in one or both of (i) a link source page, which is a page that links to the document and (ii) a link destination page, which is a page that is linked to from the document, said clue expression being different from said place name expression and serving to permit judgment of which of said plurality of place name types corresponds to said place name expression;

judging a second place name type from among said plurality of place name types that corresponds to said place name expression based on a text type of a text in said document;

judging a final place name type from among said plurality of place name types that corresponds to said place name expression based on said first place name type and said second place name type; and storing the final place name type in a memory;

wherein said clue expression is defined by a link itself or text within said one or both of the link source page and the link destination page.

8. A computer implemented place name information extraction method, comprising the computer processing steps of:

detecting a place name expression appearing in a document and a position of said place name expression in said document;

judging a place name type among a plurality of place name types that corresponds to said place name expression appearing in said document by detecting a clue expression in one or both of (i) a link source page, which is a page that links to the document and (ii) a link destination page, which is a page that is linked to from the document, said clue expression being different from said place name expression and serving to permit judgment of which of said plurality of place name types corresponds to said place name expression; and storing the place name type in a memory;

wherein said clue expression is defined by a link itself or text within said one or both of the link source page and the link destination page; and wherein said place name type is one of a location, an event site, a passing point, and a topic spot.

9. A computer implemented place name information extraction method, comprising the computer processing steps of:

detecting a place name expression appearing in a document and a position of said place name expression in said document;

judging a first place name type among a plurality of place name types that corresponds to said place name expression appearing in said document by detecting a clue expression in one or both of (i) a link source page, which is a page that links to the document and (ii) a link destination page, which is a page that is linked to from the document, said clue expression being different from said place name expression and serving to permit judgment of which of said plurality of place name types corresponds to said place name expression;

judging a second place name type from among said plurality of place name types that corresponds to said place name expression based on a text type of a text of said document;

judging a final place name type from among said plurality of place name types that corresponds to said place name expression based on said first place name type and said second place name type; and storing the final place name type in a memory;

wherein said final place name type is one of a location, an event site, a passing point, and a topic spot.

10. A computer implemented place name information extraction method, comprising the computer processing steps of:

judging a place name type among a plurality of place name types that corresponds to place name expression appearing in a document by detecting a clue expression in a link source page that links to the document, said clue expression being different from said place name expression and serving to permit judgment of which of said plurality of place name types corresponds to said place name expression; and storing the place name type in a memory.

11. A storing medium storing extraction programs for causing a computer to execute a place name information extraction process, the process comprising the step of:

judging a place name type among a plurality of place name types that corresponds to a place name expression appearing in a document by detecting a clue expression in one or both of (i) a link source page, which is a page that links to the document and (ii) a link destination page, which is a page that is linked to from the document, said clue expression being different from said place name expression and serving to permit judgment of which of said plurality of place name types corresponds to said place name expression; and storing the place name type in a memory;

wherein said clue expression is defined by a link itself or text within said one or both of the link source page and the link destination page.

12. A storing medium storing extraction programs for causing a computer to execute a place name information extraction process, the process comprising the steps of:

judging a first place name type among a plurality of place name types that corresponds to a place name expression appearing in a document by detecting a clue expression in one or both of (i) a link source page, which is a page that links to the document and (ii) a link destination page, which is a page that is linked to from the document, said clue expression being different from said place name expression and serving to permit judgment of which of said plurality of place name types corresponds to said place name expression;

judging a second place name type from among said plurality of place name types that corresponds to said place name expression based on a text type of a text in said document;

judging a final place name type from among said plurality of place name types that corresponds to said place name expression based on said first place name type and said second place name type; and storing the final place name type in a memory;

wherein said clue expression is defined by a link itself or text within said one or both of the link source page and the link destination page.

13. A storing medium storing extraction programs for causing a computer to execute a place name information extraction process, the process comprising the steps of:

detecting a place name expression appearing in a document and a position of said place name expression in said document;

judging a place name type among a plurality of place name types that corresponds to said place name expression appearing in said document by detecting a clue expression in one or both of (i) a link source page, which is a page that links to the document and (ii) a link destination page, which is a page that is linked to from the document, said clue expression being different from said place name expression and serving to permit judgment of which of said plurality of place name types corresponds to said place name expression; and storing the place name type in a memory;

wherein said clue expression is defined by a link itself or text within said one or both of the link source page and the link destination page.

14. A storing medium storing extraction programs for causing a computer to execute a place name information extraction process, the process comprising the steps of:

detecting a place name expression appearing in a document and a position of said place name expression in said document;

judging a first place name type among a plurality of place name types that corresponds to said place name expression appearing in said document by detecting a clue expression in one or both of (i) a link source page, which is a page that links to the document and (ii) a link destination page, which is a page that is linked to from the document, said clue expression being different from said place name expression and serving to permit judgment of which of said plurality of place name types corresponds to said place name expression;

judging a second place name type from among said plurality of place name types that corresponds to said place name expression based on a text type of a text of said document;

judging a final place name type from among said plurality of place name types that corresponds to said place name expression based on said first place name type and said second place name type; and storing the final place name type in a memory;

wherein said clue expression is defined by a link itself or text within said one or both of the link source page and the link destination page.

15. A storing medium storing extraction programs for causing a computer to execute a place name information extraction process, the process comprising the steps of:

judging a place name type among a plurality of place name types that corresponds to a place name expression appearing in a document by detecting a clue expression in a link source page that links to the document, said clue expression being different from said place name expression and serving to permit judgment of which of said plurality of place name types corresponds to said place name expression; and storing the place name type in a memory.

16. A computer implemented map information retrieval apparatus including computer readable media storing programming code for performing processing comprising:

extracting place name information by performing processing that comprises:

judging a place name type among a plurality of place name types that corresponds to a place name expression appearing in a document by detecting a clue expression in one or both of (i) a link source page, which is a page that links to the document and (ii) a link destination page, which is a page that is linked to from the document, said clue expression being different from said place name expression and serving to permit judgment of which of said plurality of place name types corresponds to said place name expression;

storing place name expressions and corresponding place name types that are detected by said place name information extraction process;

receiving user input specifying an inputted place name expression and an inputted place name type from among said stored place name expressions and corresponding place name types;

retrieving a map of a region from a map database using said inputted place name expression as a key;

retrieving place name expressions and corresponding place name types from among said stored place name expressions and corresponding place name types using said inputted place name expression and said inputted place name type as a retrieval key; and concurrently displaying said retrieved map and said retrieved place name expressions and corresponding place name types;

wherein said clue expression is defined by a link itself or text within said one or both of the link source page and the link destination page.

17. A computer implemented map information retrieval apparatus including computer readable media storing programming code for performing processing comprising:

judging a place name type that corresponds to a place name expression appearing in a document based on a text type of a text of said document, said place name type being one of a location, an event site, a passing point, and a topic spot;

storing place name expressions and corresponding place name types that are detected by said place name information extraction process;

receiving user input specifying an inputted place name expression and an inputted place name type from among said stored place name expressions and corresponding place name types;

retrieving a map of a region from a map database using said inputted place name expression as a key;

retrieving place name expressions and corresponding place name types from among said stored place name expressions and corresponding place name types using said inputted place name expression and said inputted place name type as a retrieval key; and concurrently displaying said retrieved map and said retrieved place name expressions and corresponding place name types.

18. A computer implemented map information retrieval apparatus including computer readable media storing programming code for performing processing comprising:

extracting place name information by performing processing comprised of:

judging a first place name type among a plurality of place name types that corresponds to a place name expression appearing in a document by detecting a clue expression in one or both of (i) a link source page, which is a page that links to the document and (ii) a link destination page, which is a page that is linked to from the document, said clue expression being different from said place name expression and serving to permit judgment of which of said plurality of place name types corresponds to said place name expression;

judging a second place name type from among said plurality of place name types that corresponds to said place name expression based on a text type of a text in said document; and judging a final place name type from among said plurality of place name types that corresponds to said place name expression based on said first place name type and said second place name type;

storing place name expressions and corresponding place name types that are detected by said place name information extraction process;

receiving user input specifying an inputted place name expression and an inputted place name type from among said stored place name expressions and corresponding place name types;

retrieving a map of a region from a map database using said inputted place name expression as a key;

retrieving place name expressions and corresponding place name types from among said stored place name expressions and corresponding place name types using said inputted place name expression and said inputted place name type as a retrieval key; and concurrently displaying said retrieved map and said retrieved place name expressions and corresponding place name types;

wherein said clue expression is defined by a link itself or text within said one or both of the link source page and the link destination page.

19. A computer implemented map information retrieval apparatus including computer readable media storing programming code for performing processing comprising:

extracting place name information by performing processing comprised of:
  detecting a place name expression appearing in a document and a position of said place name expression in said document; and
  judging a place name type among a plurality of place name types that corresponds to said place name expression appearing in said document by detecting a clue expression in one or both of (i) a link source page, which is a page that links to the document and (ii) a link destination page, which is a page that is linked to from the document, said clue expression being different from said place name expression and serving to permit judgment of which of said plurality of place name types corresponds to said place name expression;

storing place name expressions and corresponding place name types that are detected by said place name information extraction process;

receiving user input specifying an inputted place name expression and an inputted place name type from among said stored place name expressions and corresponding place name types;

retrieving a map of a region from a map database using said inputted place name expression as a key;

retrieving place name expressions and corresponding place name types from among said stored place name expressions and corresponding place name types using said inputted place name expression and said inputted place name type as a retrieval key; and concurrently displaying said retrieved map and said retrieved place name expressions and corresponding place name types;

wherein said clue expression is defined by a link itself or text within said one or both of the link source page and the link destination page.

20. A computer implemented map information retrieval apparatus including computer readable media storing programming code for performing processing comprising:

extracting place name information by performing processing comprised of:
  detecting a place name expression appearing in a document and a position of said place name expression in said document; and
  judging a place name type that corresponds to said place name expression appearing in said document from a text type of a text of said document, said place name type being one of a location, an event site, a passing point, and a topic spot;

storing place name expressions and corresponding place name types that are detected by said place name information extraction process;

receiving user input specifying an inputted place name expression and an inputted place name type from among said stored place name expressions and corresponding place name types;

retrieving a map of a region from a map database using said inputted place name expression as a key;

retrieving place name expressions and corresponding place name types from among said stored place name expressions and corresponding place name types using said inputted place name expression and said inputted place name type as a retrieval key; and concurrently displaying said retrieved map and said retrieved place name expressions and corresponding place name types.

21. A computer implemented map information retrieval apparatus including computer readable media storing programming code for performing processing comprising:

extracting place name information by performing processing comprised of:
  detecting a place name expression appearing in a document and a position of said place name expression in said document;
  judging a first place name type among a plurality of place name types that corresponds to said place name expression appearing in said document by detecting a clue expression in one or both of (i) a link source page, which is a page that links to the document and (ii) a link destination page, which is a page that is linked to from the document, said clue expression being different from said place name expression and serving to permit judgment of which of said plurality of place name types corresponds to said place name expression;
  judging a second place name type from among said plurality of place name types that corresponds to said place name expression based on a text type of a text of said document; and
  judging a final place name type from among said plurality of place name types that corresponds to said place name expression based on said first place name type and said second place name type;

storing place name expressions and corresponding place name types that are detected by said place name information extraction process;

receiving user input specifying an inputted place name expression and an inputted place name type from among said stored place name expressions and corresponding place name types;

retrieving a map of a region from a map database using said inputted place name expression as a key;

retrieving place name expressions and corresponding place name types from among said stored place name expressions and corresponding place name types using said inputted place name expression and said inputted place name type as a retrieval key; and concurrently displaying said retrieved map and said retrieved place name expressions and corresponding place name types;

wherein said clue expression is defined by a link itself or text within said one or both of the link source page and the link destination page.

22. A computer implemented map information retrieval apparatus including computer readable media storing programming code for performing processing comprising:

extracting place name information by performing processing comprised of:

judging a place name type among a plurality of place name types that corresponds to a place name expression appearing in a document by detecting a clue expression in a link source page that links to the document, said clue expression being different from said place name expression and serving to permit judgment of which of said plurality of place name types corresponds to said place name expression;

storing place name expressions and corresponding place name types that are detected by said place name information extraction process;

receiving user input specifying an inputted place name expression and an inputted place name type from among said stored place name expressions and corresponding place name types;

retrieving a map of a region from a map database using said inputted place name expression as a key;

retrieving place name expressions and corresponding place name types from among said stored place name expressions and corresponding place name types using said inputted place name expression and said inputted place name type as a retrieval key; and concurrently displaying said retrieved map and said retrieved place name expressions and corresponding place name types.

23. A computer implemented map information retrieval apparatus including computer readable media storing programming code for performing processing comprising:

extracting place name information by performing processing comprised of:

judging a place name type of a place name expression appearing in a document based on a text type of a text of said document, said place name type being one of a location, an event site, a passing point, and a topic spot; and detecting said place name expression in said document;

storing place name expressions and corresponding place name types that are detected by said place name information extraction process;

receiving user input specifying an inputted place name expression and an inputted place name type from among said stored place name expressions and corresponding place name types;

retrieving a map of a region from a map database using said inputted place name expression as a key;

retrieving place name expressions and corresponding place name types from among said stored place name expressions and corresponding place name types using said inputted place name expression and said inputted place name type as a retrieval key; and concurrently displaying said retrieved map and said retrieved place name expressions and corresponding place name types.

24. A computer implemented map information retrieval apparatus including computer readable media storing programming code for performing processing comprising:

extracting place name information by performing processing comprised of:

detecting a place name expression in a text of a document;

determining whether a group of documents neighboring and including said document in which said place name expression is detected satisfies a specific text structure; and determining a place name type that corresponds to said place name expression appearing in said document when said group of documents satisfies said specific text structure;

storing place name expressions and corresponding place name types that are detected by said place name information extraction process;

receiving user input specifying an inputted place name expression and an inputted place name type from among said stored place name expressions and corresponding place name types;

retrieving a map of a region from a map database using said inputted place name expression as a key;

retrieving place name expressions and corresponding place name types from among said stored place name expressions and corresponding place name types using said inputted place name expression and said inputted place name type as a retrieval key; and concurrently displaying said retrieved map and said retrieved place name expressions and corresponding place name types.

* * * * *